United States Patent
Dabbah et al.

(10) Patent No.: US 9,390,502 B2
(45) Date of Patent: Jul. 12, 2016

(54) POSITIONING ANATOMICAL LANDMARKS IN VOLUME DATA SETS

(71) Applicants: KABUSHIKI KAISHA TOSHIBA, Tokyo (JP); Toshiba Medical Systems Corporation, Otawara-shi (JP)

(72) Inventors: Mohammad Dabbah, Edinburgh (GB); Ian Poole, Edinburgh (GB)

(73) Assignees: KABUSHIKI KAISHA TOSHIBA, Tokyo (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 436 days.

(21) Appl. No.: 13/867,560

(22) Filed: Apr. 22, 2013

(65) Prior Publication Data

US 2014/0314290 A1     Oct. 23, 2014

(51) Int. Cl.
G06K 9/00 (2006.01)
G06K 9/62 (2006.01)
G06K 9/32 (2006.01)
G06T 7/00 (2006.01)

(52) U.S. Cl.
CPC ............ *G06T 7/0042* (2013.01); *G06K 9/6282* (2013.01); *G06T 2207/10081* (2013.01); *G06T 2207/20081* (2013.01); *G06T 2207/30008* (2013.01)

(58) Field of Classification Search
None
See application file for complete search history.

(56) References Cited

U.S. PATENT DOCUMENTS

2004/0109594 A1*  6/2004  Luo et al. .................. 382/132
2005/0027492 A1*  2/2005  Taylor ............... G06K 9/48
                                                        703/2

(Continued)

FOREIGN PATENT DOCUMENTS

WO    WO 2004/086972 A2    10/2004
WO    WO 2008/141996 A2    11/2008

OTHER PUBLICATIONS

Antonio Criminisi, et al., "Decision Forests for Computer Vision and Medical Image Analysis", Chapter 4: Classification Forests, Springer 2013, ISBN 978-1-4471-4928-6, pp. 25-45.

(Continued)

*Primary Examiner* — Matthew Bella
*Assistant Examiner* — Jose M Torres
(74) *Attorney, Agent, or Firm* — Oblon, McClelland, Maier & Neustadt, L.L.P

(57) ABSTRACT

Certain embodiments provide a computer apparatus operable to carry out a data processing method to position a set of anatomical landmarks in a three-dimensional image data set of a part or all of a patient, comprising: providing a trained supervised machine learning algorithm which has been trained to place each of the set of anatomical landmarks; applying the supervised machine learning algorithm to place the set of anatomical landmarks relative to the data set; providing a trained point distribution model, including a mean shape and a covariance matrix, wherein the mean shape represents locations of the set of landmarks in a variety of patients; and applying the point distribution model to the set of landmarks with the locations output from the supervised machine learning algorithm by: removing any landmarks whose locations have an uncertainty above a threshold with reference to the mean shape and covariance matrix; followed by: an optimization of the locations of the remaining landmarks by maximizing joint likelihood that a new shape, derived from linear combinations of eigenvectors of the covariance matrix, is plausible.

15 Claims, 24 Drawing Sheets

(56) References Cited

U.S. PATENT DOCUMENTS

2007/0086678 A1* 4/2007 Chefd'hotel et al. ......... 382/294
2008/0240527 A1 10/2008 Keller
2014/0043329 A1* 2/2014 Wang ...................... G06T 17/20
                                                          345/420

OTHER PUBLICATIONS

Antonio Criminisi, et al., "Decision Forests with Long-Range Spatial Context for Organ Localization in CT Volumes", MICCAI-PMMIA workshop, 2009, 12 pages.

Antonio Criminisi, et al., "Regression Forests for Efficient Anatomy Detection and Localization in CT Studies", MICCAI 2010 Workshop MCV, LNCS 6533, 2011, pp. 106-117.

J. Ross Quinlan, et al.,"C4.5: Programs for Machine Learning", Morgan Kaufmann series in Machine Learning, 1993, 10 pages.

T. F. Cootes, et al., "Active Shape Models-Their Training and Application", Computer Vision and Image Understanding, vol. 61, No. 1, Jan. 1995, pp. 38-59.

Juan Eugenio Iglesias, et al., "Robust Brain Extraction Across Datasets and Comparison with Publicly Available Methods", IEEE Trans. on Medical Imaging, 2011, pp. 1-18.

Antonio Criminisi, et al., "Decision Forests for Computer Vision and Medica Image Analysis", Chapter 14: Anatomy Detection and Localization in 3D Medical Images, Springer 2013, ISBN 978-1-4471-4928-6, pp. 193-209.

* cited by examiner

Fig. 19

| ForestSize | | Runtime | | MeanDistance | | MaxDistance | | ROCArea | |
|---|---|---|---|---|---|---|---|---|---|
| A | B | A | B | A | B | A | B | A | B |
| 84.000 | 84.000 | 21.458 | | 5.576 | 5.035 | 15.979 | 8.537 | .829 | .993 |
| 83.000 | 83.000 | 33.103 | | 4.761 | 4.403 | 9.680 | 7.489 | .998 | .998 |
| 85.000 | 85.000 | 36.374 | 35.577 | 5.220 | 4.892 | 8.124 | | .988 | .989 |
| 83.000 | 83.000 | 36.807 | 34.949 | 7.968 | 7.855 | 17.332 | 14.209 | .988 | 1.000 |
| 84.000 | 84.000 | 47.084 | 39.298 | 6.708 | 5.970 | 15.343 | 11.529 | 1.000 | 1.000 |
| 79.000 | 79.000 | 32.607 | 31.923 | 7.053 | 4.862 | 14.268 | 12.360 | .991 | .991 |
| 80.000 | 80.000 | 38.457 | | 6.402 | 5.129 | 11.519 | 8.962 | 1.000 | 1.000 |
| 79.000 | 79.000 | 48.527 | 40.922 | 7.944 | 6.003 | 13.940 | 12.450 | .998 | .998 |
| 80.000 | 80.000 | 35.710 | 33.365 | 5.290 | | 8.028 | | .998 | .999 |
| 84.000 | 84.000 | 49.773 | | 7.067 | 5.526 | 13.918 | 12.252 | .984 | .990 |
| 85.000 | 85.000 | 36.005 | | 7.366 | | 15.665 | | .874 | .982 |
| 82.000 | 82.000 | 42.060 | 39.807 | 18.538 | 18.376 | 167.431 | 37.886 | .853 | .915 |
| 78.000 | 78.000 | 44.500 | 40.369 | 15.036 | 12.628 | 44.837 | 24.543 | .861 | .936 |
| 81.000 | 81.000 | 39.114 | 36.900 | 10.976 | | 28.264 | | .914 | .991 |
| 82.000 | 82.000 | 45.937 | 42.112 | 7.026 | | 11.892 | | .955 | .960 |
| 79.000 | 79.000 | 51.160 | 49.346 | 7.701 | 4.825 | 12.861 | 10.625 | .974 | .994 |
| 72.000 | 72.000 | 46.094 | 45.775 | 10.938 | 7.414 | 37.811 | 15.377 | .966 | .982 |
| 79.000 | 79.000 | 33.908 | | 11.493 | | 22.389 | | .907 | .945 |
| 85.000 | 85.000 | 140.992 | | 22.175 | 22.084 | 108.958 | 53.014 | .862 | .935 |
| 83.000 | 83.000 | 141.328 | | 16.528 | 16.487 | 40.599 | 40.056 | .882 | .919 |
| 84.000 | 84.000 | 477.253 | | 60.161 | 26.893 | 250.375 | 71.052 | .394 | .437 |
| 83.000 | 83.000 | 471.865 | 463.915 | 42.216 | 21.372 | 277.247 | 41.081 | .612 | .622 |
| 85.000 | 85.000 | 173.071 | | 18.907 | 16.293 | 77.224 | 34.710 | .952 | .961 |
| 84.000 | 84.000 | 192.373 | 188.349 | 40.867 | 26.740 | 202.807 | 84.140 | .644 | .719 |
| 85.000 | 85.000 | 121.134 | 114.477 | 18.790 | | 54.532 | 41.621 | .976 | .978 |
| 85.000 | 85.000 | 302.145 | 296.495 | 42.346 | 35.957 | 185.326 | 78.896 | .636 | .651 |
| 84.000 | 84.000 | 193.929 | | 15.591 | | 45.059 | 40.970 | .939 | .975 |
| 83.000 | 83.000 | 34.187 | 30.167 | 10.423 | | 19.034 | 27.811 | .952 | .984 |
| 77.000 | 77.000 | 21.310 | | 11.357 | | 21.858 | 19.847 | 1.000 | 1.000 |
| 83.000 | 83.000 | 19.798 | 19.751 | 14.063 | 13.360 | 43.676 | 33.267 | 1.000 | 1.000 |
| 83.000 | 83.000 | 20.921 | 20.916 | 10.491 | 10.074 | 15.927 | 13.723 | 1.000 | 1.000 |
| 83.000 | 83.000 | 31.944 | 31.222 | 11.106 | 10.943 | 18.738 | | .984 | .997 |
| 83.000 | 83.000 | 27.779 | | 8.295 | | 18.681 | | .981 | .986 |
| 83.000 | 83.000 | 33.595 | 32.745 | 11.644 | | 19.234 | | .979 | .993 |
| 79.000 | 79.000 | 23.466 | 23.400 | 14.290 | 13.306 | 25.801 | 20.114 | 1.000 | 1.000 |
| 81.000 | 81.000 | 23.332 | 21.868 | 12.054 | | 17.282 | | 1.000 | 1.000 |
| 85.000 | 85.000 | 97.438 | 88.465 | 30.406 | 20.795 | 132.706 | 68.516 | .863 | .979 |
| 81.000 | 81.000 | 29.427 | 28.464 | 10.375 | | 15.350 | | .984 | .987 |
| 83.000 | 83.000 | 116.599 | | 30.428 | 17.178 | 257.474 | 54.182 | .906 | .975 |
| 83.000 | 83.000 | 64.168 | 62.451 | 18.967 | 15.135 | 43.169 | 35.027 | .867 | .991 |
| 81.000 | 81.000 | 195.146 | 192.847 | 39.497 | 23.005 | 331.981 | 68.992 | .864 | .946 |
| 79.000 | 79.000 | 88.255 | 87.115 | 40.200 | 25.248 | 200.887 | 55.066 | .901 | .987 |
| 81.000 | 81.000 | 505.689 | 505.387 | 24.696 | 23.178 | 169.843 | 49.380 | .544 | .544 |
| 83.000 | 83.000 | 85.915 | 71.473 | 25.027 | | 51.727 | | .876 | .982 |
| 83.000 | 83.000 | 203.328 | 199.033 | 43.345 | 13.952 | 183.439 | 38.357 | .853 | .939 |

POSITIONING ANATOMICAL LANDMARKS IN VOLUME DATA SETS

BACKGROUND OF THE INVENTION

Embodiments described herein generally relate to three-dimensional (3D) image data sets of a patient and in particular how to position anatomical landmarks therein.

In the medical field, three-dimensional (3D) image data sets, i.e. volume data sets, are collected by a variety of techniques—referred to as modalities in the field—including computer assisted tomography (CT), magnetic resonance (MR), single photon emission computed tomography (SPECT), ultrasound and positron emission tomography (PET). Volume data comprises a plurality of voxels arranged in a 3D grid. Each voxel has a voxel value associated with it. The voxel values represent measurements of a physical parameter. For example, in the case of CT scans, the voxel values represent the opacity of those voxels to X-rays, i.e. their X-ray stopping power. X-ray stopping power is measured in Hounsfield units (HUs) which is closely correlated with density (mass per unit volume).

Anatomical landmarks play an important role in labelling patient images. Conventionally, they are used as a point of reference by clinicians either to define a specific location for its own sake, or to provide a location used for a measurement such as a distance measurement or an angular measurement to or relative to another landmark.

Volume data sets are visualised with a visualization application, i.e. a computer program, to present two-dimensional (2D) images on a screen calculated from the volume, i.e. 3D, patient data set. The process of calculating two-dimensional (2D) images of 3D objects is referred to as volume rendering. Volume rendering can be applied to slab multi-planar reformatting (MPR), for example.

Accurate detection and classification of anatomical landmarks in volume data sets is useful for a rendering application, since it can enable user navigation of the patient image data and can be used to trigger contextually-dependent functionality and analysis. Anatomical landmarks can, for example, be used to provide context-based visualization options, such as choices of potentially suitable presets from among a large library of presets. [A preset defines a mapping between image values in an image data set and what shade pixels or voxels having those image values are given when displayed to a user—typically by selecting a particular combination of window level and window width known to be suitable for visualizing a particular tissue type]. Landmarks may also be used as an aid to segmentation or in conjunction with segmentation data.

Anatomical landmarks also allow comparison of different images and their registration without original data, such as between images from two different patients, or of the same patient taken at different times (e.g. movie frames taken a fraction of a second apart, or images taken weeks, months or years apart such as pre- and post-operative or -trauma).

Anatomical landmarks may also be used in their conventional way as an interpretation aid by a clinician using the visualization application.

However, the nature of patient data is that it is inherently dynamic and noisy. Moreover, the human body comes in a wide variety of shapes and forms, for example as dictated by age, so accurate positioning of landmarks in a patient image will always be a challenge.

It is therefore an important task of the visualization application to accurately place landmarks in an automated way.

A discriminative classification approach, such as provided by decision trees or decision forests, is one known automated method of placing anatomical landmarks in a patient image data set.

A discriminative classification approach to place anatomical landmarks will generate possible candidate locations independently of each other which can be a disadvantage as now described with an example.

FIG. 1 is an image of a CT image data set of the thorax and pelvic region of a patient. Superposed on the image are a number of landmark points. The "cross" landmark points are correct and are derived from manual placement, i.e. represent the ground truth. The "dot" landmark points are at locations placed by a classification forest method according to the prior art, and incorporate a mixture of minor and gross errors. Corresponding ground truth (cross) and modeled (dot) landmark points are linked with a straight line. Where no line is shown, the landmark does not appear in the ground truth set for this image. The classification approach has independently assigned the locations of the anatomical landmarks. However, according to anatomical knowledge, the correct configuration of the detected landmarks is violated. This is due to the absence of global awareness to the relative location of landmarks. Correctly identified landmarks are not able to assist in correcting errors in the placement of other landmarks.

In particular, the modelled (dot) landmark inside the oval in the right hand side of the figure is grossly misplaced compared to the ground truth (cross) landmark which is some distance above it, but the classification forest model is not able to use the (almost) correctly placed neighbouring landmarks as a cue to correct the grossly misplaced landmark.

Further, the cluster of modelled (dot) landmarks circled near the bottom right of the image are in fact head landmarks. The placement of head landmarks by the classification forest takes place, because the decision forest is not spatially aware of neighbouring detected landmarks, so their position will not be corrected despite the obvious misclassification error. This feature is general to any discriminative detection approach including other types of decision forest.

BRIEF DESCRIPTION OF THE DRAWINGS

Embodiments of the invention are now described by way of example only with reference to the following drawings.

FIG. 19 is a table showing the results for the examples of FIGS. 13 to 18, and other examples, in a different form, specifically by the error of each automatically placed landmark as measured by its separation from its corresponding ground truth landmark.

DETAILED DESCRIPTION

Figure 1:
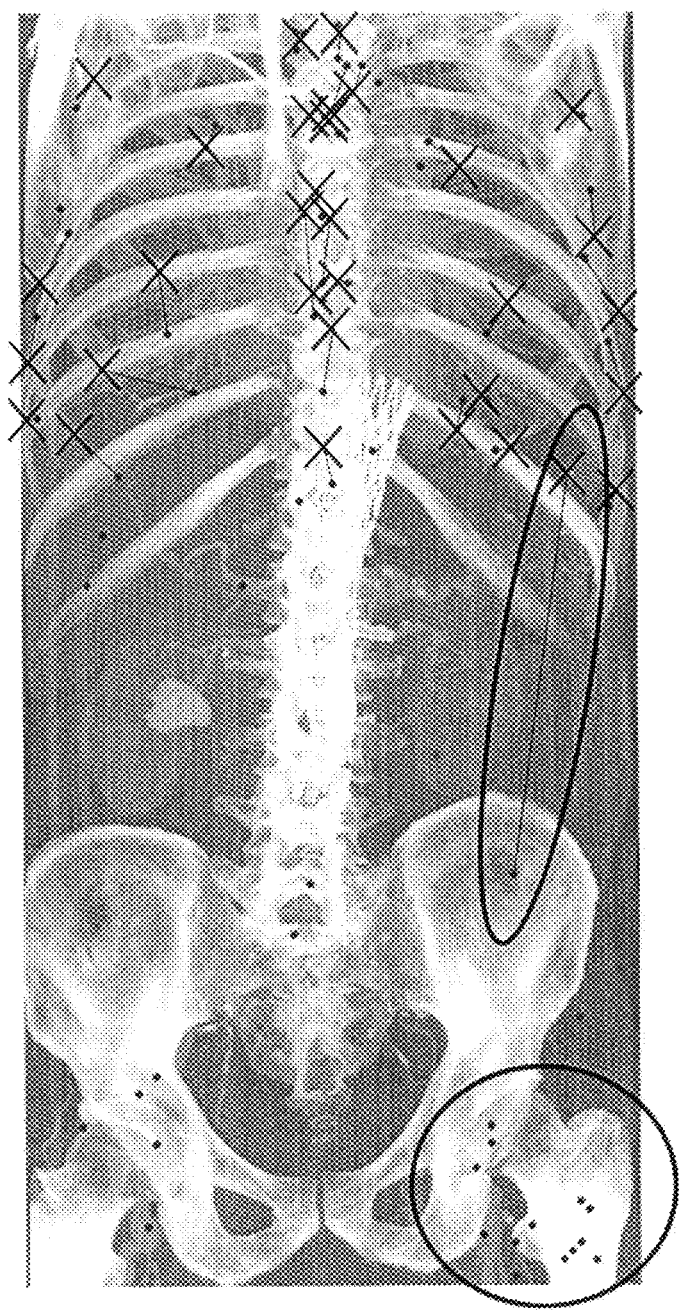
FIG. 1 is an image of a CT image data set of the thorax and pelvic region of a patient with model-placed ("dots") and ground truth ("crosses") anatomical landmarks superposed.

Certain embodiments provide a computer apparatus operable to carry out a data processing method to position a set of anatomical landmarks in a three-dimensional image data set of a part or all of a patient, comprising: a. providing a trained supervised machine learning algorithm which has been trained to place each of the set of anatomical landmarks; b. applying the supervised machine learning algorithm to place the set of anatomical landmarks relative to the data set; c. providing a trained point distribution model, including a mean shape and a covariance matrix, wherein the mean shape represents locations of the set of landmarks in a variety of patients; and d. applying the point distribution model to the set of landmarks with the locations output from the supervised machine learning algorithm by: d(i) removing any landmarks whose locations have an uncertainty above a threshold with reference to the mean shape and covariance matrix; followed by: d(ii) an optimisation of the locations of the remaining landmarks by maximising joint likelihood that a new shape, derived from linear combinations of eigenvectors of the covariance matrix, is plausible.

In accordance with certain embodiments, if a landmark is removed in d(i), it is later replaced at a location obtained from the other landmarks with reference to the mean shape.

In accordance with certain embodiments, the landmark replacement is carried out before said optimisation, so that replaced landmarks are included in said optimisation.

In accordance with certain embodiments, the landmark removal in the point distribution model is done by iteratively computing a weighted least trimmed square and in each iteration removing the landmark with the highest residual squared sum, wherein the iteration is terminated when the highest residual squared sum is below the threshold.

In accordance with certain embodiments, the trained supervised machine learning algorithm is a decision forest algorithm.

In accordance with certain embodiments, the decision forest algorithm is based on classification.

In accordance with certain embodiments, the decision forest algorithm is based on regression.

Certain embodiments provide a method of positioning a set of anatomical landmarks in a three-dimensional image data set of a part or all of a patient, comprising: a. providing a trained supervised machine learning algorithm which has been trained to place each of the set of anatomical landmarks; b. applying the supervised machine learning algorithm to place the set of anatomical landmarks relative to the data set; c. providing a trained point distribution model, including a mean shape and a covariance matrix, wherein the mean shape represents locations of the set of landmarks in a variety of patients; and d. applying the point distribution model to the set of landmarks with the locations output from the supervised machine learning algorithm by: d(i) removing any landmarks whose locations have an uncertainty above a threshold with reference to the mean shape and covariance matrix; followed by: d(ii) an optimisation of the locations of the remaining landmarks by maximising joint likelihood that a new shape, derived from linear combinations of eigenvectors of the covariance matrix, is plausible.

In accordance with certain embodiments, if a landmark is removed in d(i), it is later replaced at a location obtained from the other landmarks with reference to the mean shape.

In accordance with certain embodiments the landmark replacement is carried out before said optimisation, so that replaced landmarks are included in said optimisation.

In accordance with certain embodiments the landmark removal in the point distribution model is done by iteratively computing a weighted least trimmed square and in each iteration removing the landmark with the highest residual squared sum, wherein the iteration is terminated when the highest residual squared sum is below the threshold.

In accordance with certain embodiments the trained supervised machine learning algorithm is a decision forest algorithm.

In accordance with certain embodiments the decision forest algorithm is based on classification.

In accordance with certain embodiments, the decision forest algorithm is based on regression.

Certain embodiments provide a non-transitory computer program product storing machine readable instructions for performing a computer-automated data processing method of positioning a set of anatomical landmarks in a three-dimensional image data set of a part or all of a patient, comprising: a. providing a trained supervised machine learning algorithm which has been trained to place each of the set of anatomical landmarks; b. applying the supervised machine learning algorithm to place the set of anatomical landmarks relative to the data set; c. providing a trained point distribution model, including a mean shape and a covariance matrix, wherein the mean shape represents locations of the set of landmarks in a variety of patients; and d. applying the point distribution model to the set of landmarks with the locations output from the supervised machine learning algorithm by: d(i) removing any landmarks whose locations have an uncertainty above a threshold with reference to the mean shape and covariance matrix; followed by: d(ii) an optimisation of the locations of the remaining landmarks by maximising joint likelihood that a new shape, derived from linear combinations of eigenvectors of the covariance matrix, is plausible.

Certain embodiments provide an image acquisition device loaded with and operable to execute machine readable instructions for performing a computer-automated data processing method of positioning a set of anatomical landmarks in a three-dimensional image data set of a part or all of a patient, comprising: a. providing a trained supervised machine learning algorithm which has been trained to place each of the set of anatomical landmarks; b. applying the supervised machine learning algorithm to place the set of anatomical landmarks relative to the data set; c. providing a trained point distribution model, including a mean shape and a covariance matrix, wherein the mean shape represents locations of the set of landmarks in a variety of patients; and d. applying the point distribution model to the set of landmarks with the locations output from the supervised machine learning algorithm by: d(i) removing any landmarks whose locations have an uncertainty above a threshold with reference to the mean shape and covariance matrix; followed by: d(ii) an optimisation of the locations of the remaining landmarks by maximising joint likelihood that a new shape, derived from linear combinations of eigenvectors of the covariance matrix, is plausible.

Decision Forest

Decision forests are a kind of supervised machine learning algorithm which can implement both a classification approach or a regression approach to machine learning. A general overview can be found in the following text book:

*Decision Forests in Computer Vision and Medical Image Analysis*
Antonio Criminisi and Jamie Shotton
Springer 2013, ISBN 978-1-4471-4928-6.

Other articles by the same group at Microsoft Research Laboratories in Cambridge, United Kingdom that are specific to application of decision forests to medical image data, specifically CT data, are:

*Decision Forests with Long-Range Spatial Context for Organ Localization in CT Volumes*
Antonio Criminisi, Jamie Shotton and Stefano Bucciarelli
MICCAI-PMMIA workshop, 2009

*Regression Forests for Efficient Anatomy Detection and Localization in CT Studies*
Antonio Criminisi, Jamie Shotton, Duncan Robertson, and Ender Konukoglu MICCAI 2010 Workshop MCV, LNCS 6533, p. 106-117, 2011.

The former describes a method using classification-based decision forests (usually referred to in the literature as classification forests), whereas the latter describes a method using regression-based decision forests (usually referred to in the literature as regression forests). Numerous other publications by the same authors describe various aspects and applications of decision forests.

In the present implementation of the method described herein, we use a classification forest as the first step in our method to provide an initial placement of landmarks associated with medical image data, and then output the landmarks from the classification forest to provide the starting positions of landmarks in a point distribution model (PDM), the PDM being described further below.

In common with other processes based on self-learning, a classification forest algorithm first learns how to place the landmarks with reference to a training data set of patient images in which the correct landmark positions are already known, typically from being manually placed by an expert user. Generally care should be taken that the training data set is representative of the full spectrum of variations likely to occur in the patient population, A training data set which accurately represents the patient population may be referred to as unbiased. These are referred to as ground truth data sets.

Figure 2:
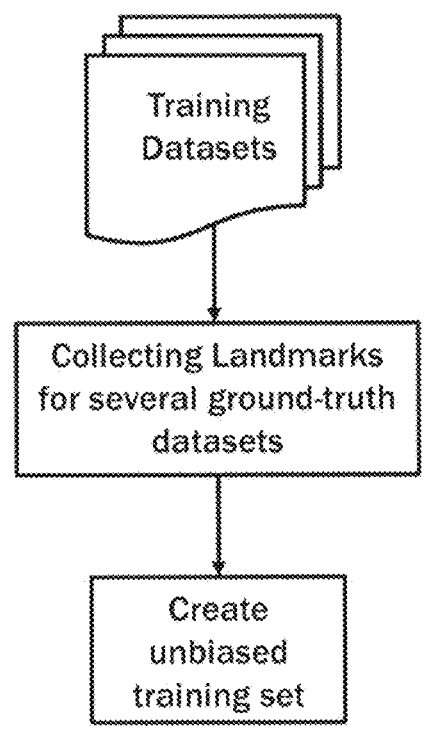
FIG. 2 depicts creation of an unbiased training data set.

FIG. 2 schematically depicts creation of the unbiased training data set in which landmarks are placed on multiple training data images to create ground truth data. For training, the training data set is typically split into two. For example, if there are 120 training data sets, these may be randomly split into two groups, for example two equal sized groups of 60. One group is used to train the classification forest and the other group is used to test the performance of the trained classification forest, by comparing where the trained classification forest places the landmarks and where the landmarks should be according to the ground truth placements. Once the classification forest is deemed to have acceptable performance (or at least known strengths and weaknesses) it can be applied generally to patient images (which may be referred to as unknown or novel datasets to which the process is to be applied).

Figure 3:
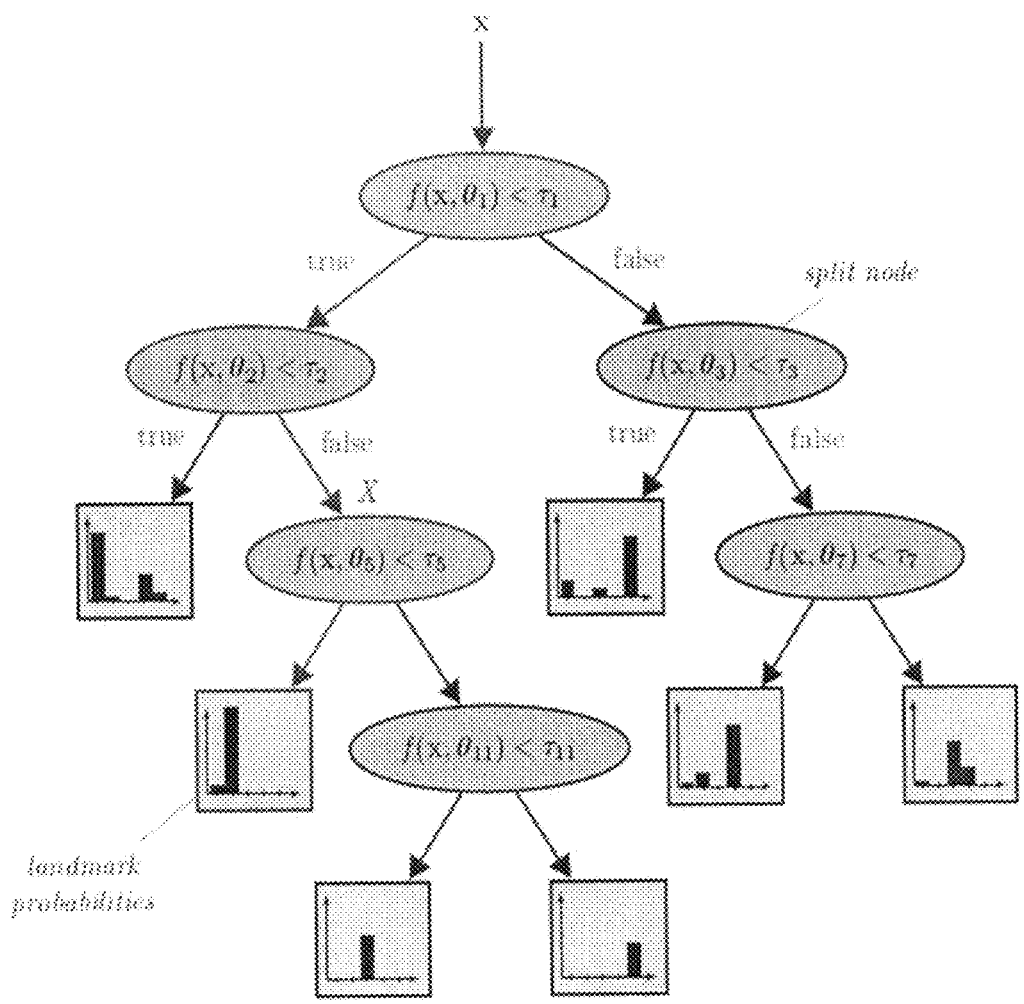
FIG. 3 depicts the principles of classification in each decision tree that makes up a decision forest according to known techniques.

FIG. 3 schematically depicts the principles of classification in each decision tree that makes up the decision forest in accordance with conventional techniques. Consider a data volume V comprising a plurality of voxels. Each voxel x is pushed down a decision tree, going through certain number of split nodes and ending up in a leaf node. On reaching a leaf node, following a certain path, the voxel is assigned to each class (that is to say, specific landmark, or background) with a certain probability. In FIG. 3, this assignment is schematically represented by the histograms at the leaf nodes, in which the Y axis represents probability of the voxel belonging to each of the landmarks represented on the X axis. When all voxels have passed through the tree, the presence/absence of a landmark is decided by considering the probabilities of different voxels corresponding with that landmark, and its location is predicted by calculating its average position over the voxels taking.

As schematically shown in FIG. 3, each split node (decision) is associated with a so-called feature, $\theta_i$, and a threshold $\tau_i$. A function $f(\theta_i, x)$ is computed for the feature for a given voxel x, and the resulting value is compared to the threshold. If the value of $f(\theta_i, x)$ is greater than the threshold $\tau_i$, the classification path for the voxel through the tree will traverse to the left side, and otherwise will traverse to the to the right side.

Figure 4A:
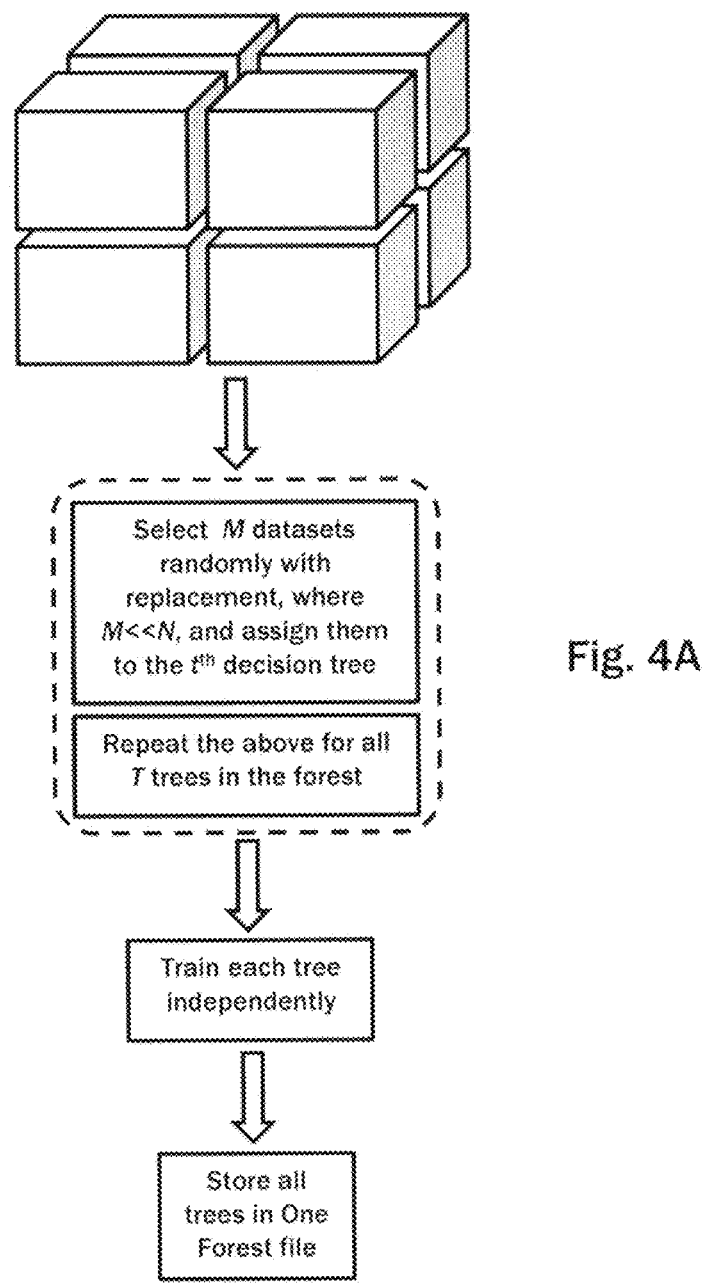
FIG. 4A is a block schematic diagram illustrating the training of the decision forest.

FIG. 4A is a schematic diagram representing the decision forest training process using conventional techniques.

To train the decision forest, N training datasets with ground-truth placement of landmarks are provided. The number N will typically be 50 to 200, but the magnitude will depend on factors such as degree of variation in the population.

A training data selection is then made. A subset M of the N datasets is randomly selected with replacement, where M<<N, and assigned to the $t^{th}$ decision tree. This is repeated for all T trees in the forest. Thus, each tree is assigned a subset of the training datasets to be trained on, and these subsets may overlap.

Each tree is then trained independently, and the trees are then stored in one forest file.

Figure 4B:
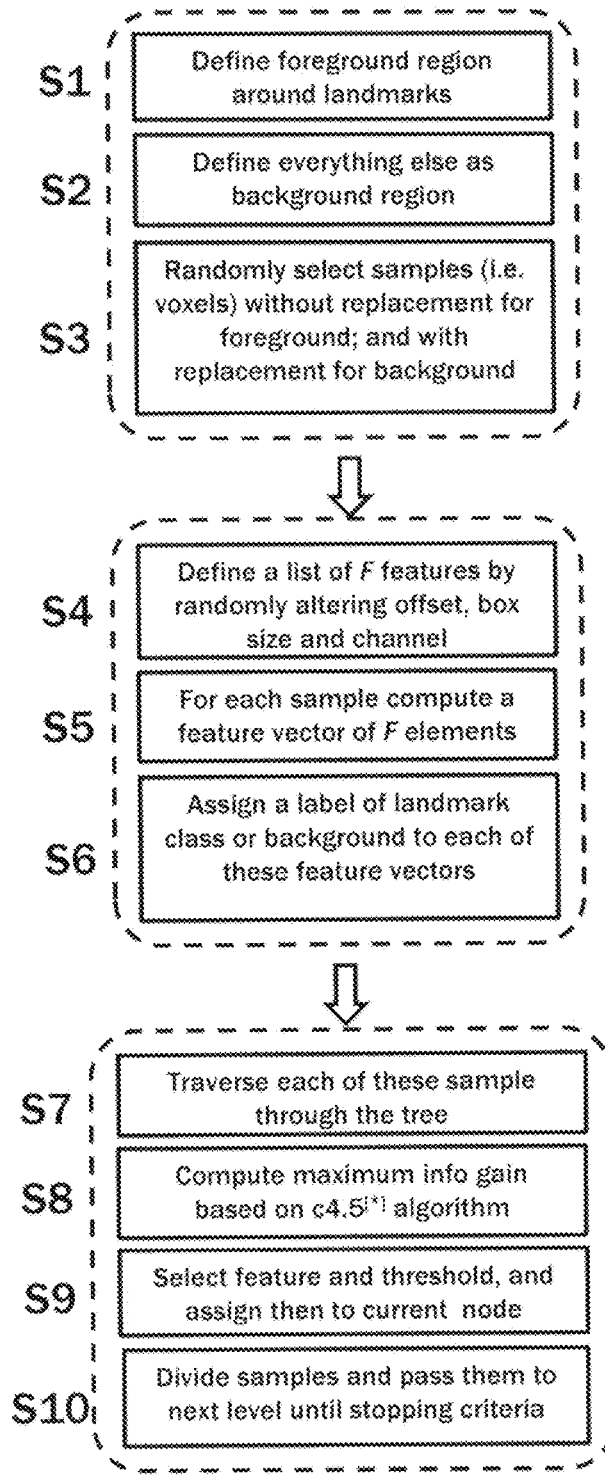
FIG. 4B is a block schematic diagram illustrating the training of an individual tree in the decision forest.

FIG. 4B is a block schematic diagram illustrating the training of an individual tree in the decision forest in accordance with established techniques.

In Steps S1 to S3 represented in FIG. 4B the foreground and background regions are defined and sampled from within the M datasets. This is done by defining a foreground region around landmarks and then defining all other voxels as background region voxels. Samples (i.e. voxels) are then randomly selected without replacement for foreground; and with replacement for background.

Thus, in Step S1, a foreground region is defined, consisting of all voxels lying within a given range of any landmark.

In Step S2, a background region is defined, consisting of all voxels not defined as within the foreground region.

In Step S3, a number of samples (voxels) are selected from the foreground and background. In the case of the foreground, samples are randomly selected without replacement, i.e. each is unique. In the case of the background, samples are randomly selected with replacement. A record is kept of which landmark each foreground sample relates to.

In Steps S4 to S6 represented in FIG. 4B, features are defined. A list of F features is defined by randomly assigning offset, box size and channel (discussed further below). For each sample a feature vector of F elements is computed. Then, a label of landmark class or background is assigned to each of these feature vectors.

Figure 6:
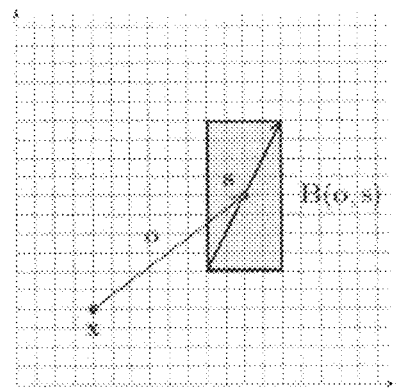
FIG. 6 is a 2D illustration of the Long Range Spatial Feature box size (s) and offset (0) parameters for a given landmark point (x).

Thus in Step S4, a list of F "features" is defined by randomly assigning values for offset, box size and channel (these terms are defined in the description of FIG. 6.) A feature consists of a triplet of values of offset, box size and channel; thus the list consists of F such triplets.

Each feature defines a sampling method that can be applied in relation to a sample. The list length F may be large. For example, in one embodiment, the list contains 2500 features.

In Step S5, for each sample, a feature vector of F elements is computed. That is to say, for each triplet, from the sample, the specified offset and box size are applied and the specified channel is computed based on the voxels within the box.

In Step S6, each of the feature vectors is labelled either as background or as relating to a specific landmark.

In Steps S7 to S10 represented in FIG. 4B the decision tree is trained using the samples (and the associated labelled feature vectors). The purpose is to choose a single feature and threshold for each split node, which will provide the "decision" at that node when the tree is in use.

Thus in Step S7, a set of samples is passed to a node in the tree. On the first occasion, the full set of samples is passed to the root node of the tree. In subsequent iterations, increasingly smaller subsets are passed to later nodes in the tree.

In Step S8, the "information gain" of each of the features in the sample set at the current node is calculated using the C4.5 algorithm:

J Ross Quinlan. C4.5: Programs for Machine Learning
Morgan Kaufmann series in Machine Learning
Morgan Kaufmann, 1993.

In Step S9, the C4.5 algorithm selects the feature (and associated threshold) that best divides the sample set into two dissimilar subsets. The selected feature and threshold are assigned to the current node, which is now termed a "Split node".

In Step S10, the samples are divided according to the selected feature and threshold and assigned to subsequent nodes, whereupon Steps S7 to S9 are repeated until stopping criteria are reached. For example, a stopping criterion might be that the size of the sample subset is below a minimum size.

Figure 5:
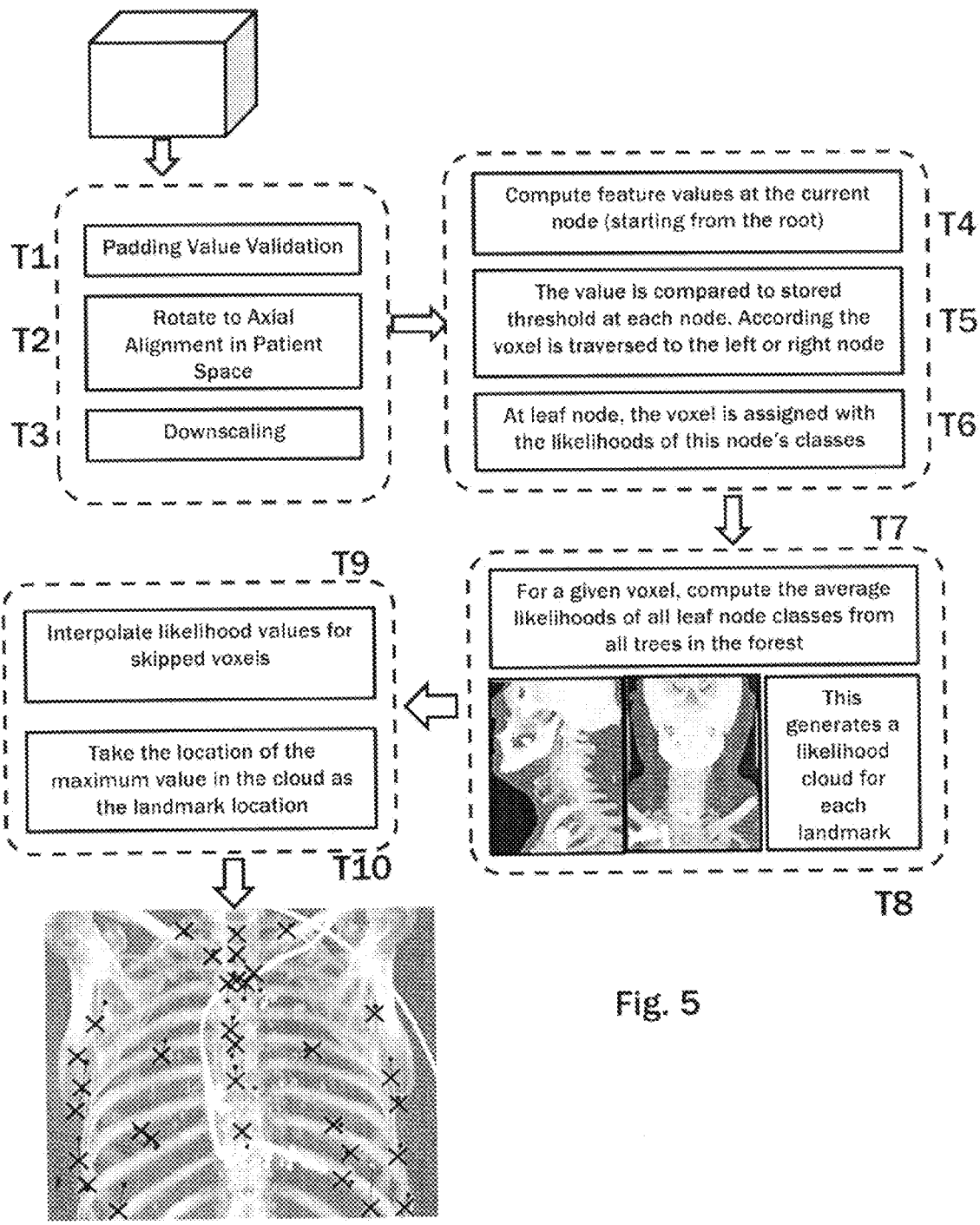
FIG. 5 is a flow diagram illustrating the process of applying the decision forest to a novel, i.e. unknown, data set.

FIG. 5 is a schematic block schematic diagram illustrating application of the trained decision forest to a novel data set.

In Step T1, given a novel dataset, e.g. volume data of a CT scan, the detection environment pre-processes the data by first validating a padding value so that padding voxels will not be used during detection. A padding value is a value that a voxel in the CT scan takes to indicate that it is not part of the data. Usually it is outside the range of the possible data values, and any voxels that have this padding value should not be processed as part of the data.

In Step T2, the dataset is rotated to Axial alignment in the Patient Space, which is an anatomical coordinate system generally aligned with the scanning protocol at data acquisition to represent a standard anatomical position of a human in a CT scanner.

In Step T3, the dataset is downscaled by certain factor (e.g. downscaled to 4 mm per voxel) to reduce the processing time.

Once the pre-processing is done, each voxel of the dataset is passed down the trees in the forest starting at the root node.

In Step T4, at a given split node, the feature defined at that node is computed. In Step T5, the computed value is compared to the associated stored threshold at the node. According to the results of this comparison, the voxel is passed to the right or left side child node. Steps T4 and T5 are repeated until the voxel reaches a leaf node.

In Step T6, on reaching a leaf node, the voxel is assigned the likelihoods of this node's classes (as discussed above in relation to FIG. 3).

The procedure (Steps T4 to T6) is repeated for each voxel in the dataset and for all trees in the forest.

In Step T7, for each voxel, the average of likelihoods from all trees is computed to give a likelihood value for this voxel at all classes/landmarks.

As shown in Step T8, this generates a likelihood cloud for each class (specific landmark, or background) derived from all trees in the forest.

For efficiency reasons not every voxel's likelihood is evaluated in certain embodiments. This means, that not all voxels are passed through the tree nodes. This is done by skipping a certain number of voxels when iterating over the data volume.

In Step T9, the likelihoods at these skipped voxels are interpolated from the surrounding values.

In Step T10, the final likelihood value of a particular landmark is taken to be the highest value in the cloud, and the location of this highest value in 3D is taken to be the landmark position in the dataset as schematically illustrated in the final image of FIG. 5.

As noted above, the split nodes use features to be able to decide which path a particular voxel should follow. These features are based on a random offset and box size of each landmark, computed in a particular channel.

As schematically shown in FIG. 6, a feature F is parameterised as offset O and box size S. The offset O=(Ox; Oy; Oz), is the 3D Euclidian distance from the landmark location at x to the centre of the feature cuboid S (here in this 2D illustration is referred to as box). The 3D size of this cuboid is defined by the parameter S=(Sx; Sy; Sz).

Another parameter of the feature is the channel C (e.g. radiodensity; gradient) each feature is computed from a particular representation of the data, and each of these representation is called a Channel. For example, the radiodensity channel is a simple representation of the intensity values of the data represented in HU, whereas the gradient channel is the magnitude of the gradient values of the intensity. Each feature is computed using one of these channels, and this is determined randomly.

When training, samples are extracted from the dataset and presented to the trees with a given label which is the ground-truth data of this voxel (i.e. this voxel is a landmark or is background).

Figure 7:
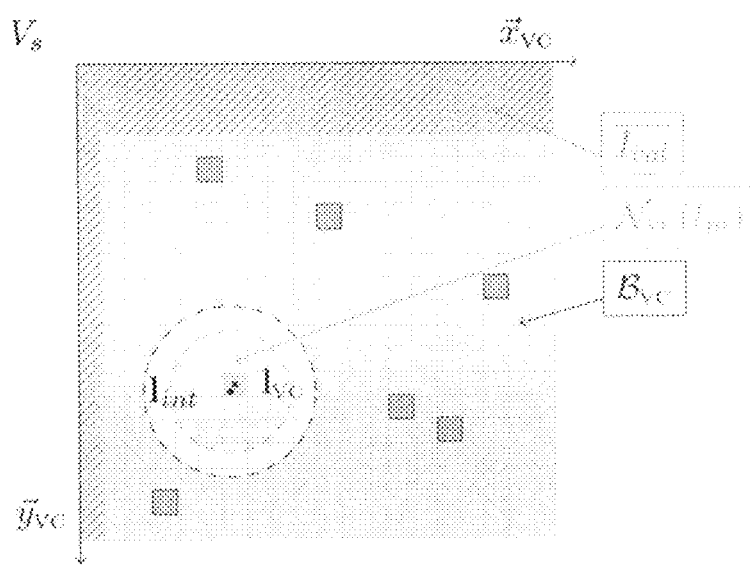
FIG. 7 is a diagram indicating the foreground and background sampling strategy to train the decision forests. Background samples are randomly selected (with replacement) from the area outside the dashed circles, whereas the foreground samples are randomly selected (without replacement) from the area inside the smallest dashed circle.

FIG. 7 schematically illustrates the foreground and background sampling strategy used to train the decision forests. Background samples are randomly selected (with replacement) from the area outside the dashed circles, whereas the foreground samples are randomly selected (without replacement) from the area inside the smallest dashed circle.

Figure 8:
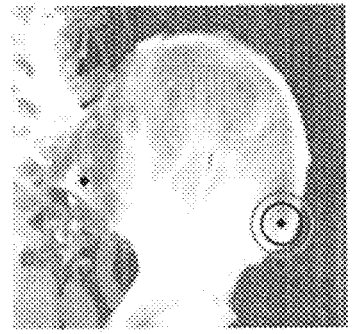
FIG. 8 is schematically showing a pelvic anatomical landmark. The region encircled by the smaller circle around the landmark in FIG. 8 is used to select foreground samples to train this particular landmark. The region outside the larger circle is used to select background samples.

FIG. 8 schematically shows a pelvic anatomical landmark. The region encircled by the smaller circle is used to select foreground samples to train this particular landmark. The region outside the larger circle is used to select background samples, e.g. such as schematically shown by the shaded squares in FIG. 7.

Point Distribution Model (PDM)

Point distribution models (PDMs) were proposed by Cootes and co-workers and have since become a standard method in image processing for identifying features in images:

T. F. Cootes, C. J. Taylor D. H. Cooper and J. Graham "Active shape models—their training and application" *Computer Vision and Image Understanding* (61): 38-59 (1995)

In PDM methods, a target object or pattern is defined by a set of points or landmarks, such as a set of landmarks that trace an outline of a particular object, such as the hand. For example, one landmark of the hand might be the tip of a finger. A PDM method is then based on superposing the landmarks roughly on an image and then iteratively moving the landmarks by small distances to find their most likely position. The function that drives this iterative movement of the landmarks is a function optimized by training against a set of images that cover a representative variation of how the object may appear in such images. The training images have landmarks positioned on them—usually manually—provide ground truth data.

In the context of the present method, each landmark represents an anatomical landmark of medical significance as referenced to a particular bone, organ or lumen, for example.

In the present method we use a Point Distribution Model (PDM) to post-process the detected landmarks output from the classification forest. In other embodiments, we could use a different generative model instead of a PDM. In other words, the PDM is used to post-process the likelihood values of a classification algorithm for anatomical landmarks.

Figure 9:
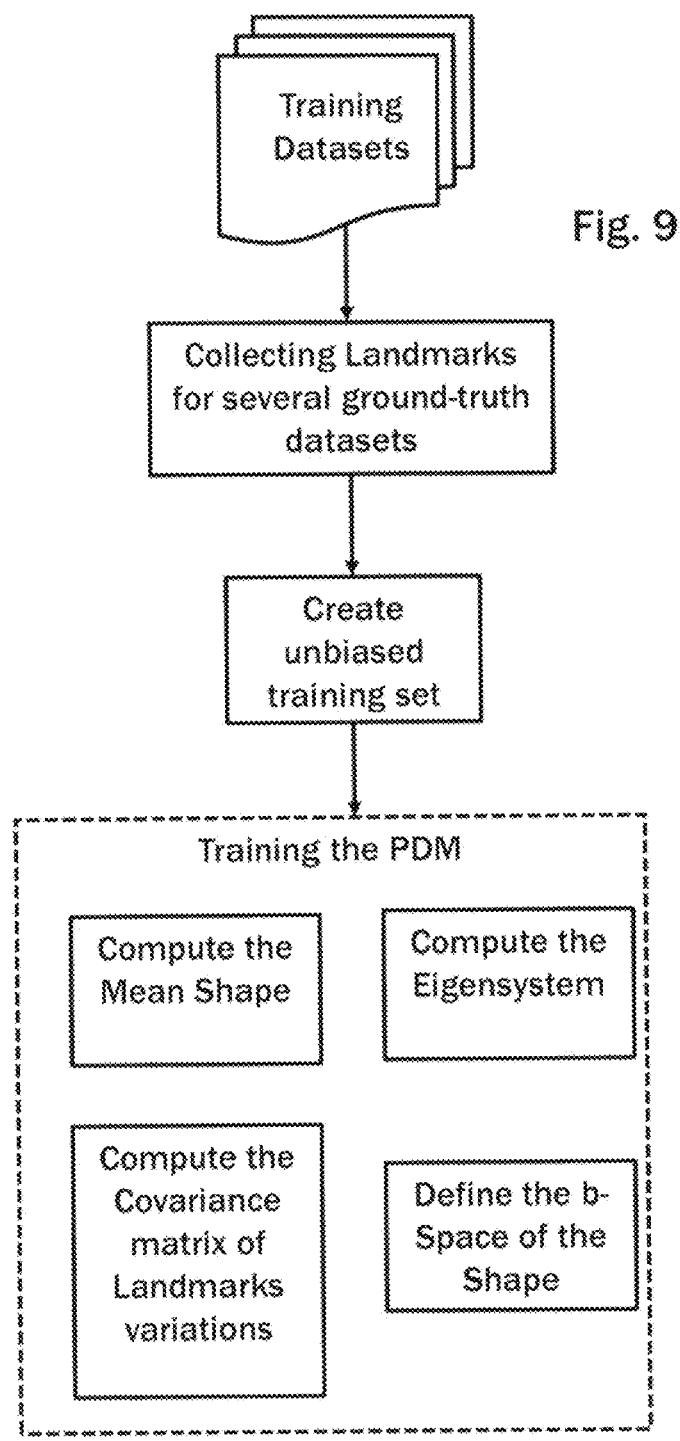
FIG. 9 is a block schematic diagram illustrating the training of a point distribution model (PDM).

FIG. 9 shows the principal steps for creating the unbiased training set and then training the PDM. The PDM is trained on ground-truth datasets. A collection of landmarks from several datasets acquired from different body compartments make up the training set.

$$s_i \triangleq \{v_1, v_2, \ldots v_{Mi}\} \in S$$

where $v_k$ is a landmark $$S \triangleq \{s_1, s_2, \ldots s_n\}$$

where $s_k$ is a set of landmarks from the $k^{th}$ scan

This training set should be unbiased for optimum performance, that is, it should take into consideration the situation where some landmarks are missing from some ground-truth datasets.

$$N_i = N_j \forall i \cdot j$$

where $N_i$ is the number of a particular landmark represented in the training set S $$\mu_{vi} = \frac{1}{N_i - 1} \sum_{k=0}^{N_i} v_k$$

the unbiased value is the mean of every landmark

The PDM models the spatial variation of landmarks, in particular it delivers:

the Mean Shape $$\mu_s = \frac{1}{N_i - 1} \sum_{n \in N} S_n$$

the Eigensystem $$det(\Sigma_S - \lambda J) = 0$$

where $\Sigma_S$ is the covariance matrix of S and $\lambda$ is the eigenvalue and the b-Space of the PDM, which enables optimisation over a smaller number of parameters to find the best shape.

The trained PDM is then applied to a novel dataset in two main stages, as is described in the PDM literature, namely an initial fitting of the PDM followed by optimization according to joint likelihoods.

In order to be able to treat the detected landmarks from the classification approach as part of the same shape or configuration model, they have to belong at least to the mean shape defined by the PDM.

Figure 10:
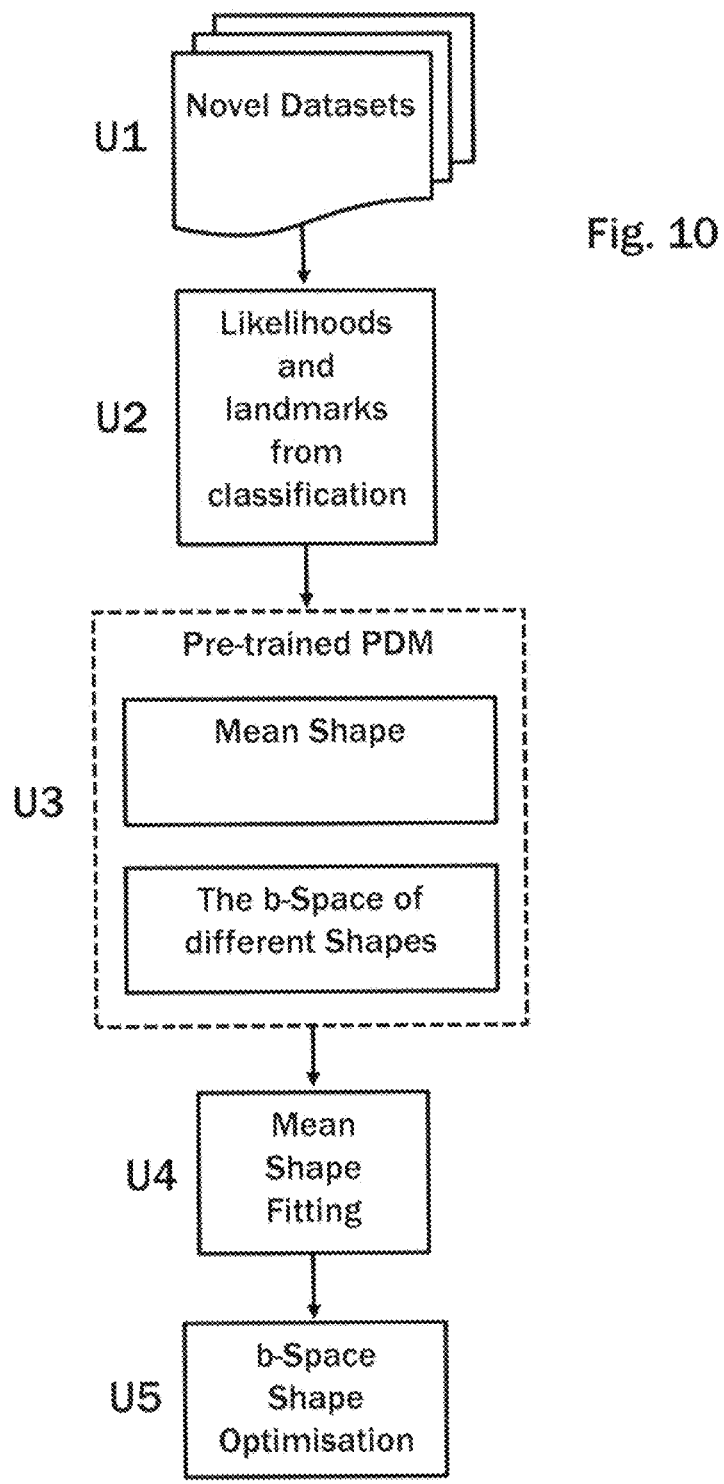
FIG. 10 is a flow diagram illustrating the process of applying the PDM to the results of the decision forest for a novel, i.e. unknown, data set.

FIG. 10, is a diagram presenting an overview of how the decision forest and the PDM are applied on a novel dataset.

Step U1, receiving a novel dataset.

Step U2, applying the trained decision forest to generate the likelihood clouds for each landmark.

Step U3, receiving the computed "mean shape" and "b-space from the pre-trained PDM.

Step U4, performing the initial fitting stage as described below with reference to in FIG. 11.

Step U5, running the b-space optimisation as explained below.

Figure 11:
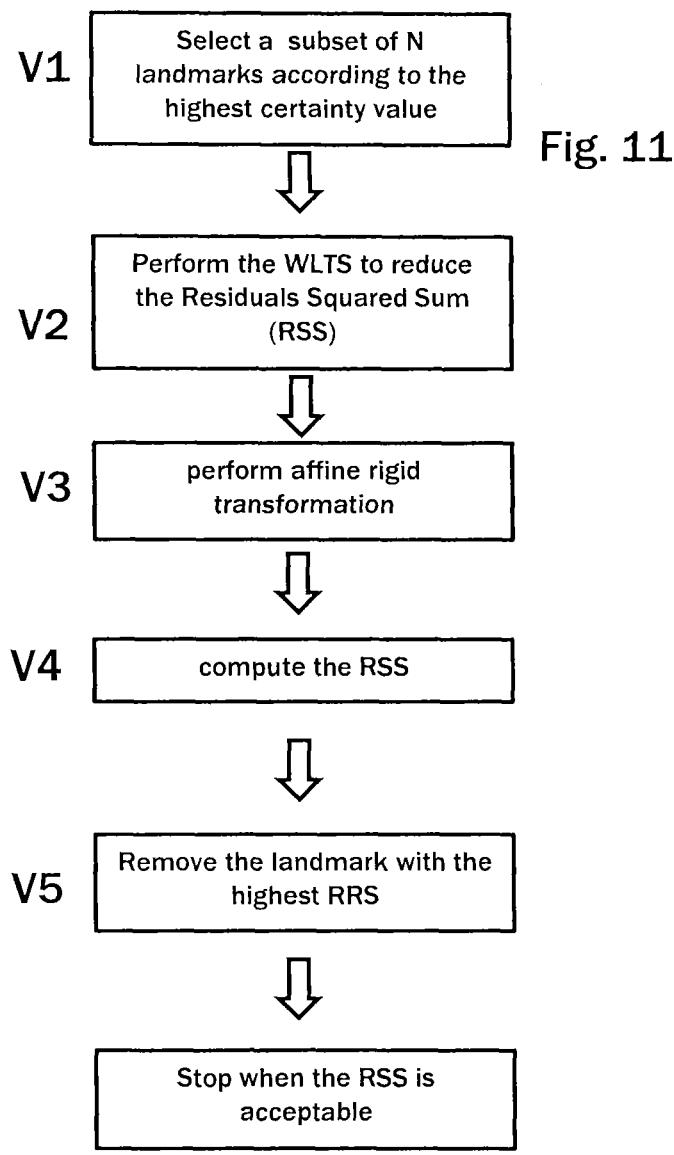
FIG. 11 is a flow diagram illustrating the initial fitting of the PDM to the novel datasets after applying the decision forest.

FIG. 11 schematically illustrates steps involved in the initial fitting of Step U4 of FIG. 10 which are now described. Initial fitting in this example is done using a Weighted Least Trimmed Square (WLTS) approach which is a known method described in the literature, for example in the text book Tilo Strutz (2010) "Data Fitting and Uncertainty—A practical introduction to weighted least squares and beyond" Vieweg & Teubner, ISBN 978-3-8348-1022-9.

Step V1, a subset of N landmarks is selected according to the highest certainty value.

Step V2, WLTS is performed to reduce the Residuals Squared Sum (RSS) iteratively according to the formula $$RSS = \sum_{i \in \overline{N}} \omega_i (v_i - DF(v_i))^2 \arg \min_{\overline{N}} \{RSS\}$$

where $$\overline{N} \subseteq N$$

and $\omega_i$ is the certainty from the decision forest for the $i^{th}$ landmark Step V3 and V4, affine rigid transformation is performed and the RSS is computed.

Step V5, the landmark with the highest RSS is removed.

The procedure is iterated (Steps V2 to V5) until the landmark with the highest RSS has an RSS below a threshold deemed to represent an acceptable likelihood.

The next step in the PDM method is optimization according to joint likelihoods. The certainty clouds from the classification approach (e.g. decision forest) are used. The initial position (highest certainty value in the clouds) is localized.

The mean shape is fitted as described above. There is then an optimization according the highest joint likelihoods using the formula $$\arg\max_{b}\left\{\prod_{n=0}^{N}(P(x_n\mid\theta_b])\right\}$$

where $x_n$ is the position of the $n^{th}$ landmark
N is the total number of landmarks, and
$\theta_b$ is the model at b in the shape space
The landmark positions are then constrained using the PDM according to the formula $$(P/\theta_B)>\epsilon)$$

Where $\epsilon$ has its normal meaning in the context of PDM, namely it is the probability of the constrained b-Space defined by the PDM, and more specifically it is the probability of a "well-behaved shape" as a function of the variance in the training set computed as three times the square root of the eigenvalue.

After detecting the anatomical landmarks using the classification approach, the PDM can be applied to further improve the landmark set through one or more of the following measures.

Where $\epsilon$ takes its normal meaning in the context of PDM, namely it is the probability of the constrained b-Space defined by the PDM. It is the probability of a "well-behaved shape" as a function of the variance in the training set computed as 3 times the square root of the eigenvalue. (it's a known PDM property)

The PDM can be used to improve the detection by removing falsely detected landmarks and/or adding falsely missed landmarks.

The PDM can be used to improve localisation by eliminating outliers, and repositioning them in the expected location, and by preserving the configuration of landmarks with respect to each other, e.g. head landmarks can be expected to be superior (in the medical sense) to thorax landmarks.

The PDM can be used to optimise location according to the computed b-shapes to accommodate for different body sizes and shapes and the likelihood clouds generated by the classification approach.

EXAMPLES

Figure 12:
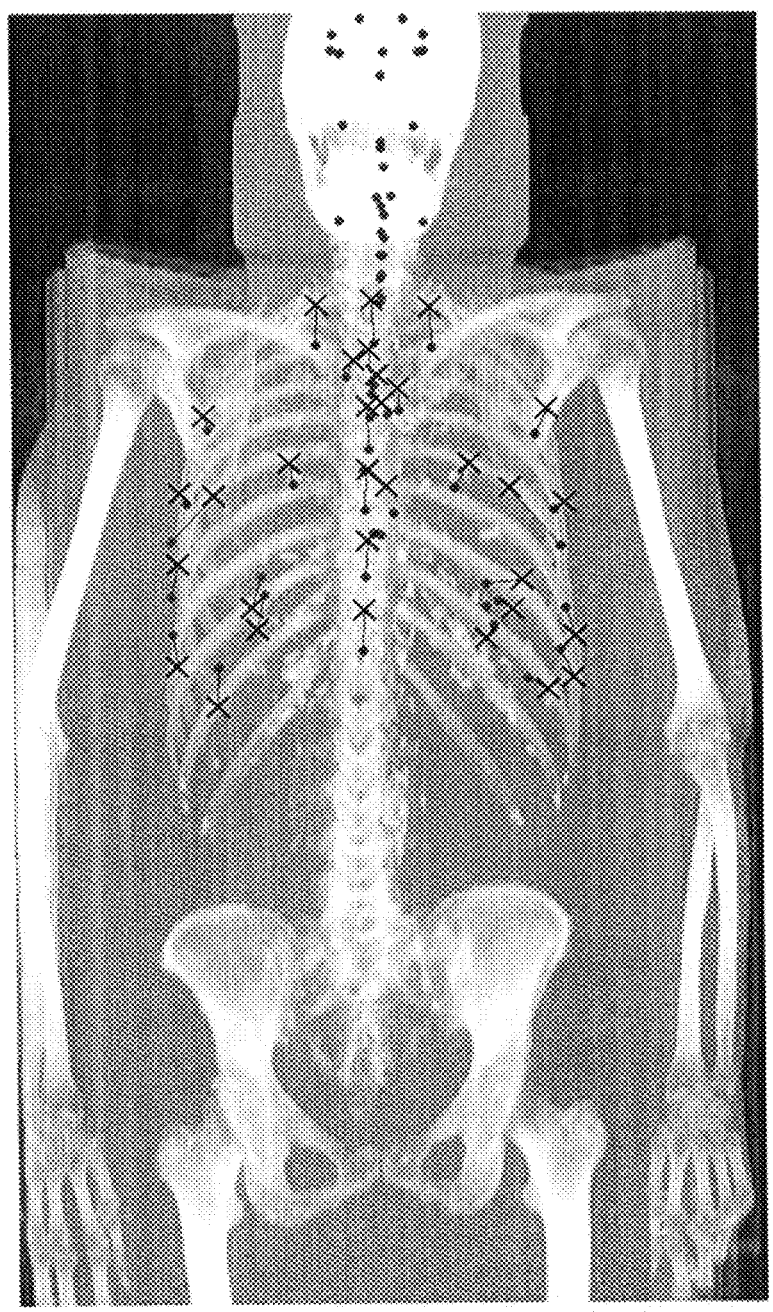
FIG. 12 schematically shows example results for a CT image of the human body.
Figure 13A:
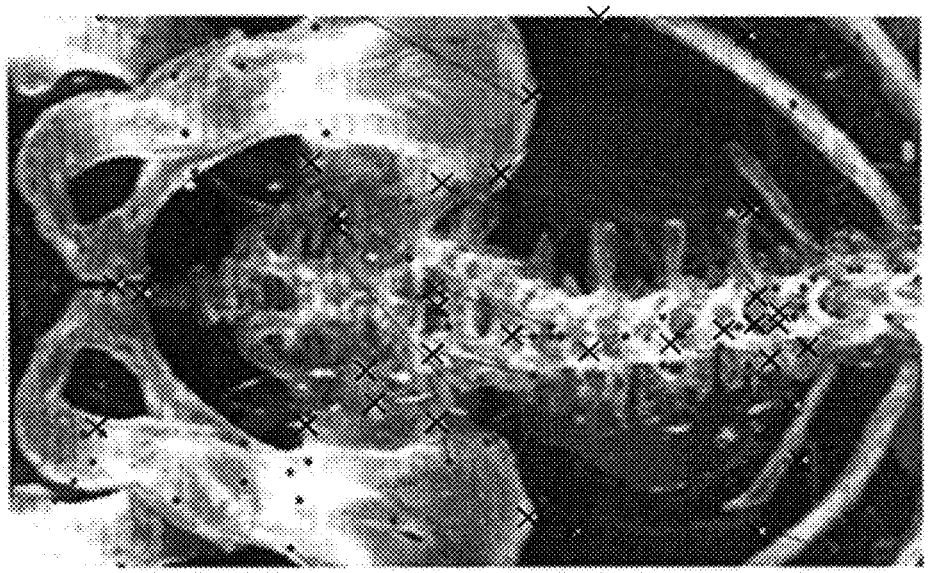
FIGS. 13 to 18 shows a number of pairs of CT images of the human body respectively labelled A and B, where the 'A' label images schematically show the intermediate result after the initial landmark placement by the decision forest, and the 'B' label images schematically show the final result after the PDM has been applied.
Figure 13B:
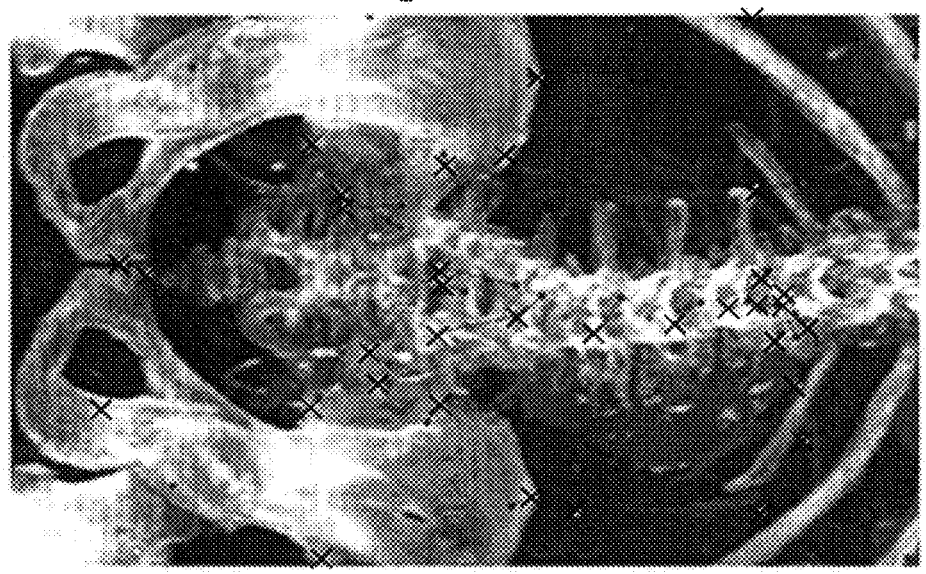
Figure 14A:
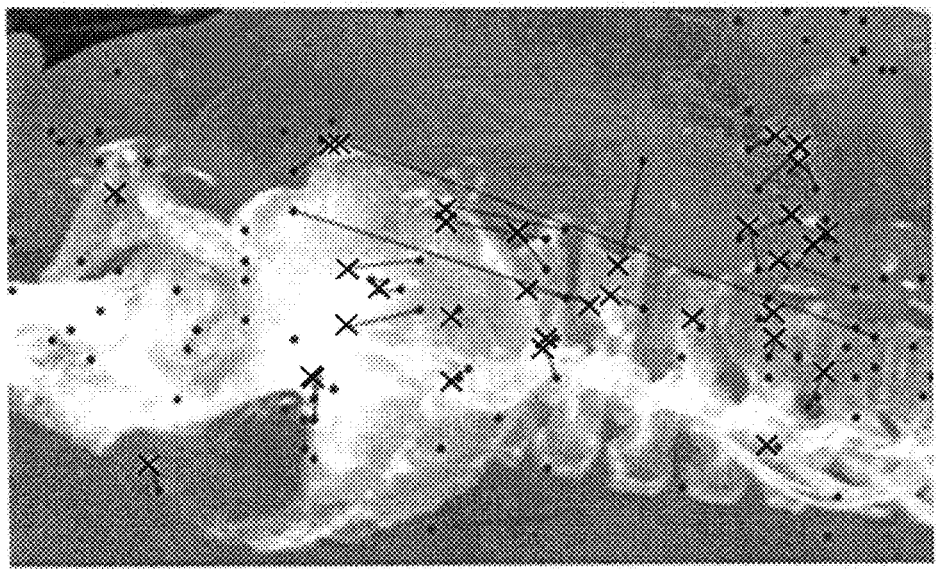
Figure 14B:
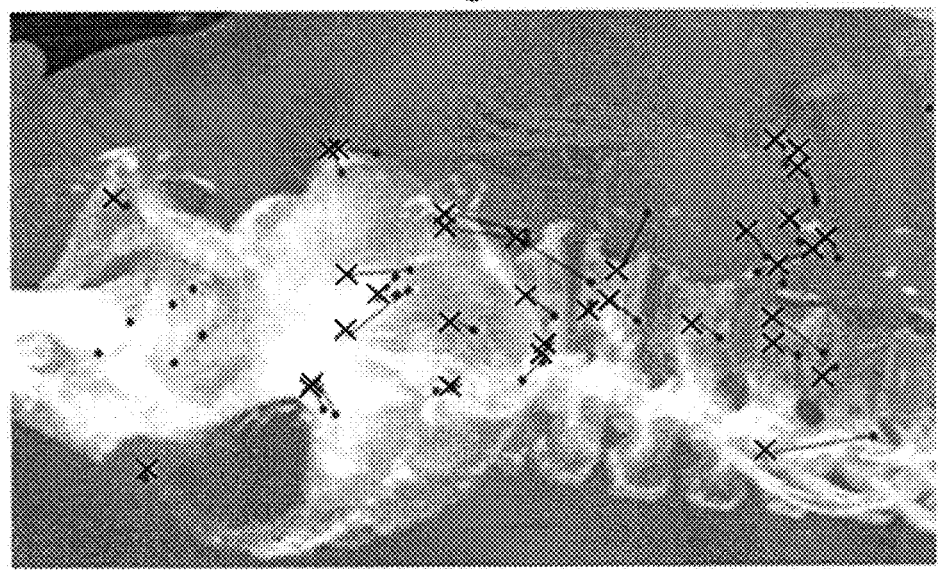
Figure 15A:
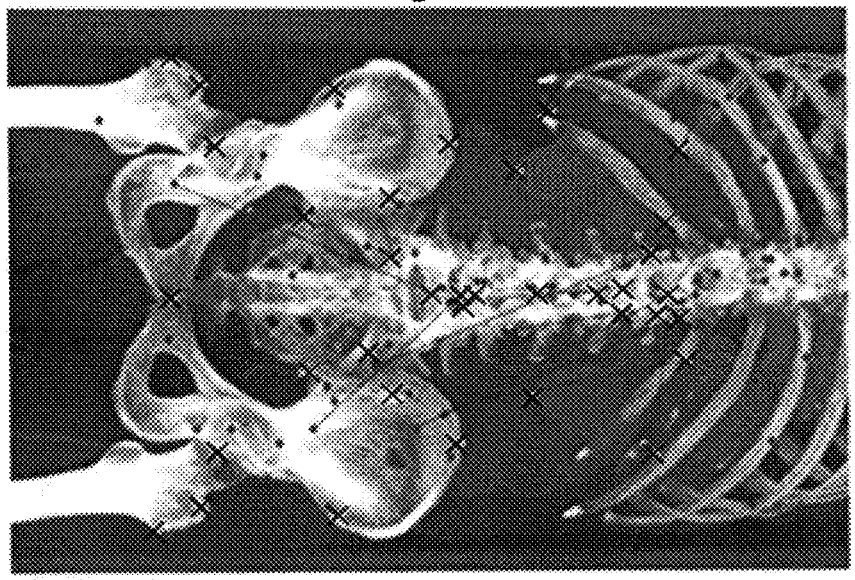
Figure 15B:
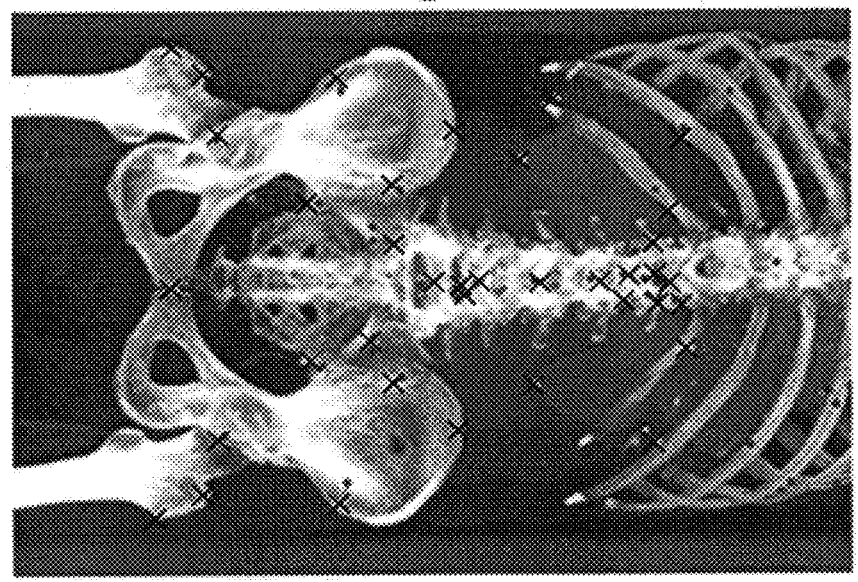
Figure 16A:
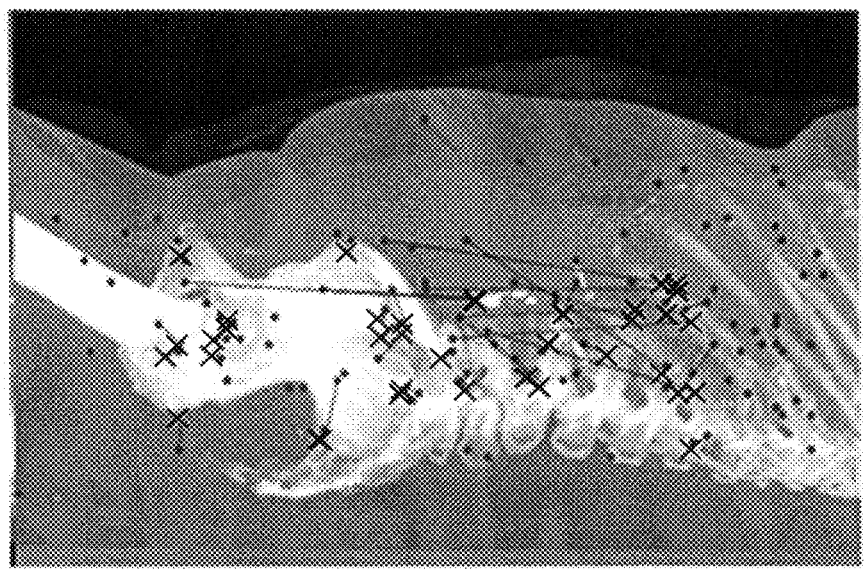
Figure 16B:
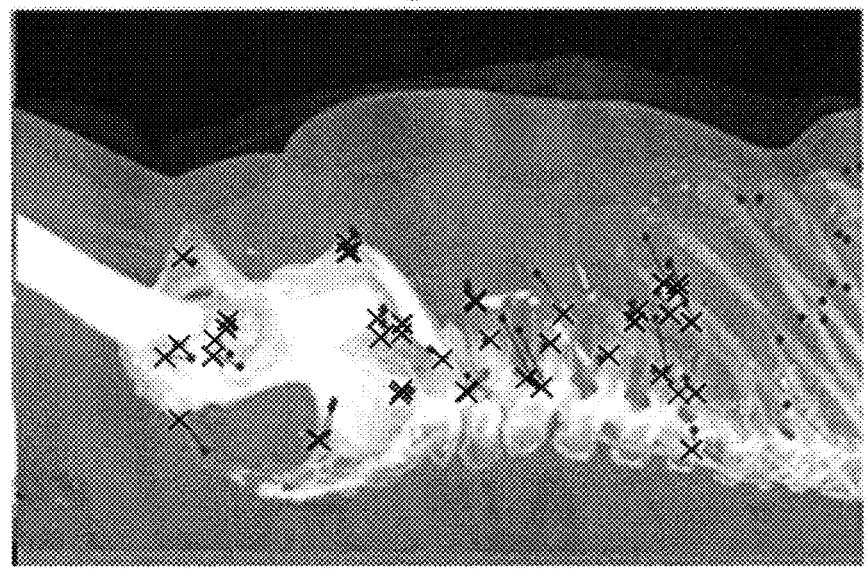
Figure 17A:
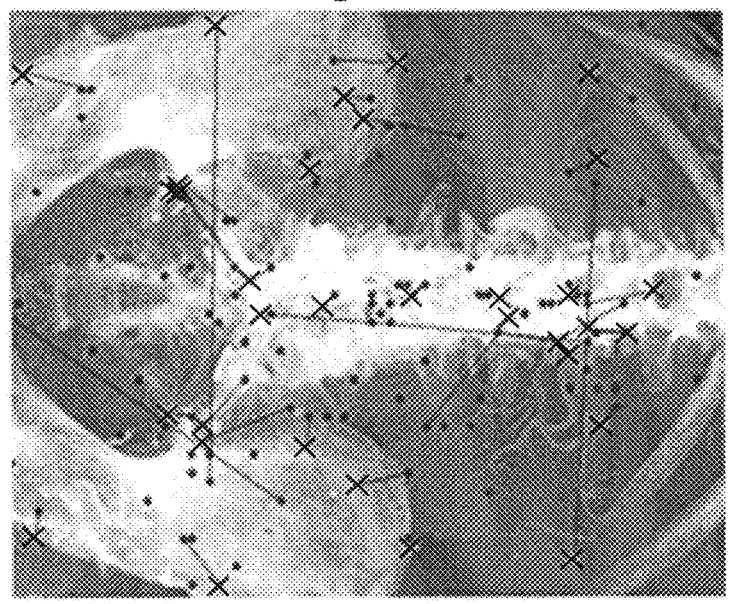
Figure 17B:
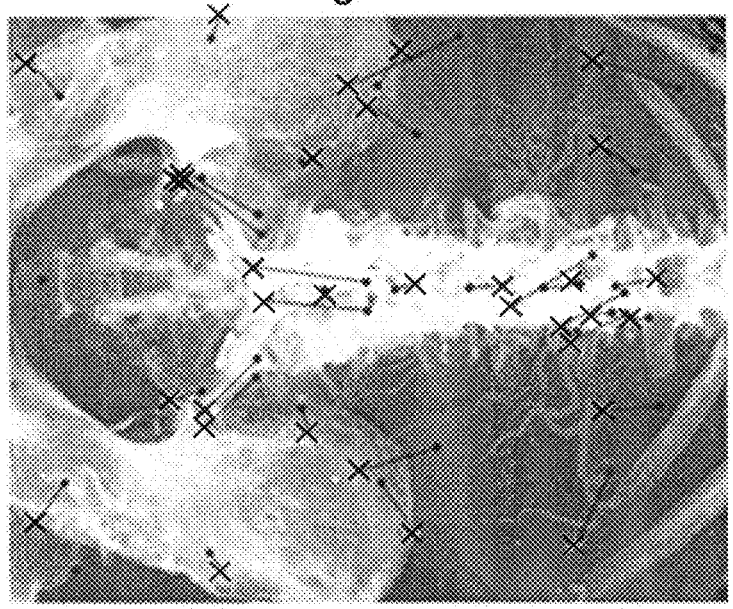
Figure 18A:
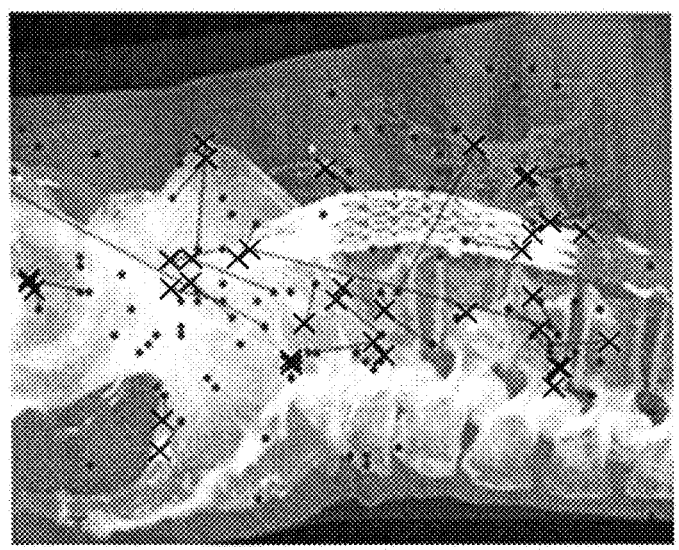
Figure 18B:
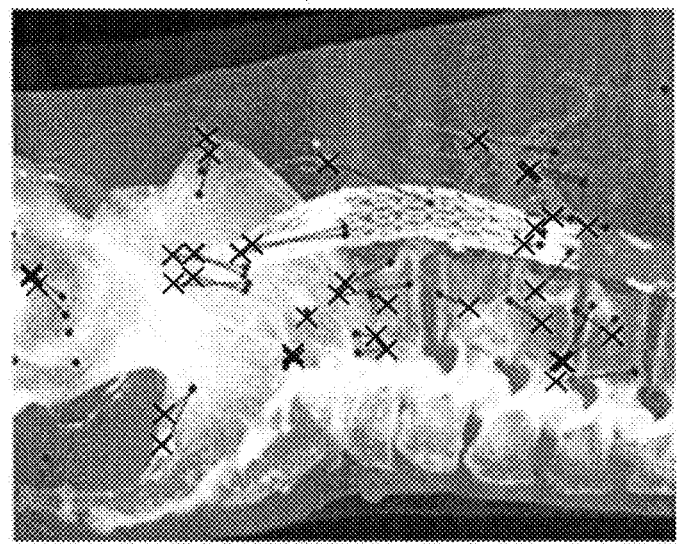

FIG. 12 shows a CT image of the human body. The cross points are ground truth landmarks. The dot points are the landmarks as positioned by the above described method of using a decision forest to initially place the landmarks followed by using a PDM to adjust the landmark positions. The lines interconnect corresponding landmarks and thus show the error from ground truth of the automatically placed landmarks.

As well as correcting the detection rates and locations of landmarks placed by the decision forest, the PDM also infers unmarked landmarks (as shown in the head).

FIGS. 13 to 18 show a number of pairs of CT images labelled A and B, where the 'A' label images show the intermediate result after the initial landmark placement by the decision forest, but before optimisation using the PDM, and the 'B' label images show the final result after the PDM has been applied. As in previous figures, the cross points are ground truth landmarks, the dot points are the automatically placed landmarks, and the lines interconnect corresponding landmarks.

As can be seen by comparing the respective "A" and "B" images from FIGS. 13 to 18, the application of the PDM optimisation provides for more reliable landmark placement.

FIG. 19 is a table schematically representing the results for the examples of FIGS. 13 to 18, and other examples, in a different form, specifically by the error of each automatically placed landmark as measured by its separation from its corresponding ground truth landmark.

Each row represents an example. The first two columns specify the forest size (shown for both the "A" and "B" images, but these are the same). The next two columns specify the Runtime for each example for "A" and "B". The next two columns specify the Mean Distance between landmark placements and their corresponding ground truth locations. The next two columns specify the Maximum Distance between the landmark placements and corresponding ground truth locations for each example. The final two columns specify the area under a Receiver Operating Characteristic (ROC) curve for each example. Certain cells are darker shaded in FIG. 19 and these show the cases where the PDM step has not improved the placement of the landmark as characterised by the parameter of the relevant column. As can be seen the PDM step provides an overall improvement in terms of Average Mead Distance Error [mm] and Receiver Operating Characteristic (ROC) area in comparison with ground-truth data (i.e. there are fewer dark-shaded cells than non-dark-shaded cells). The mean distance is based on the Euclidian distance between the detected location of a landmark and the actual location according to some ground-truth data collected by a clinical expert. A smaller distance means more accurate localization of landmark by the automated system. The ROC area is a measure indicating the accuracy of detecting a landmark in the novel scan regardless of its location. So, when a landmark is detected in the novel scan, and according to the ground-truth of this scan, the landmark is there, the ROC area increases. Equivalently, when the automated system indicated that a landmark is missing from the novel scan and this is also confirmed by the ground-truth. The higher the ROC area, the better.

Averaged over all the landmarks, the mean distance or separation between the ground truth and automatically placed locations was 17.718 mm after the decision forest step and 14.996 after the PDM step.

Again taking account of all the landmarks, the maximum distance or separation between the ground truth and automatically placed locations, i.e. the most poorly placed landmark, was 73.290 mm from its correct position after the decision forest step and 34.464 mm after the PDM step. This significant improvement in the worst error following application of the PDM demonstrates how the PDM process can identify and correct gross mis-classification errors which a decision forest approach alone is prone to.

A Receiver Operating Characteristic (ROC) curve is a plot which illustrates the performance of the decision forest as its output certainty threshold is varied. It is created by plotting the fraction of true positives out of the positives (TPR=true positive rate) vs. the fraction of false positives out of the negatives (FPR=false positive rate), at various threshold settings.

Figure 20A:
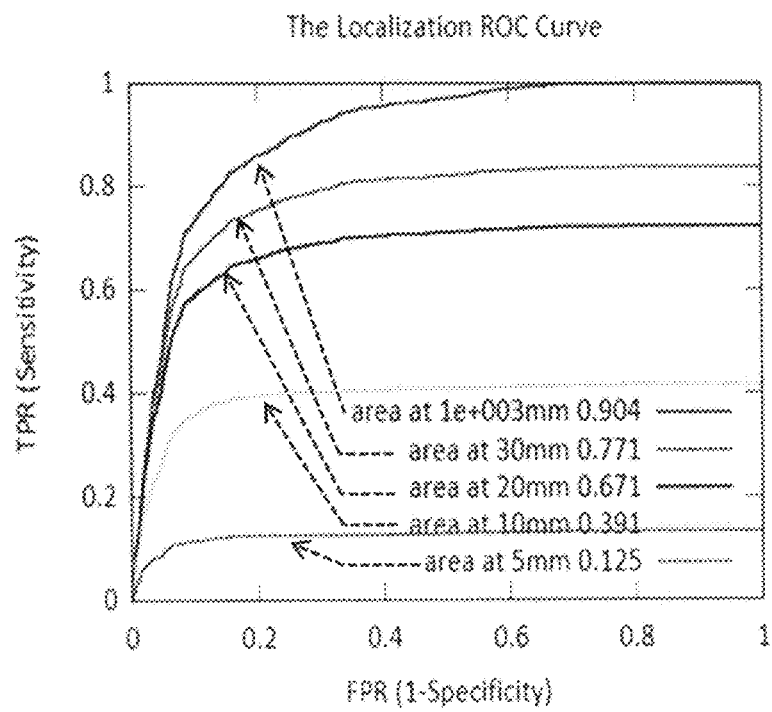
FIG. 20A is a localisation Receiver Operator Characteristic (ROC) curve for a method using solely the decision forest.
Figure 20B:
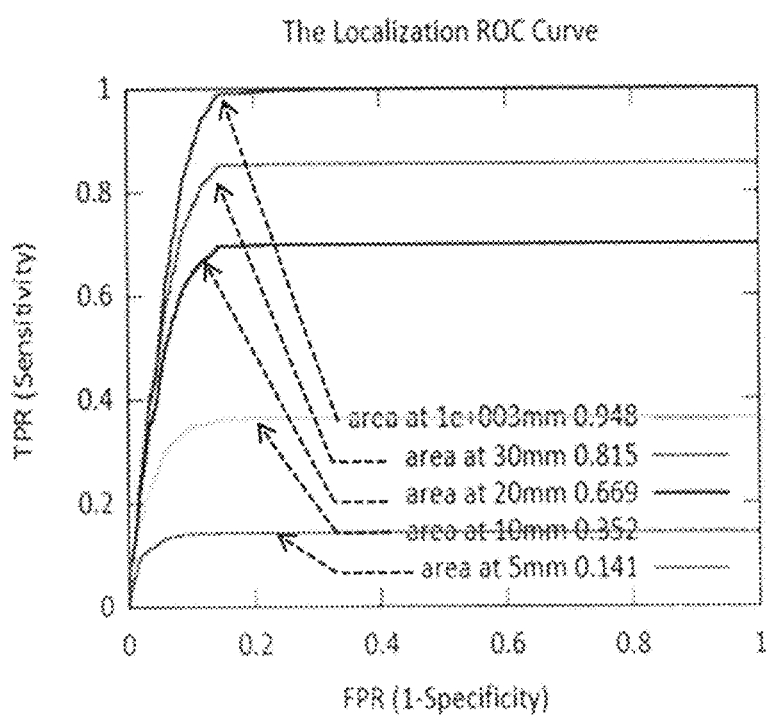
FIG. 20B is a localisation ROC curve for a method using the decision forest and PDM.

A Localization ROC curve (LROC) is a plot similar to the ROC but it illustrates the performance of the decision forests at a given distance of the detected landmarks as measured from the ground-truth location. For example, a detected landmark is considered as a true positive if its certainty values given by the decision forest is greater than the certainty threshold, as in the ROC, and its distance from the ground-truth is smaller than the distance threshold by the LROC. In FIGS. 20A and 20B, the LROC curves at 1000 mm are equivalent to the ROC curve (1000 mm is in effect considered infinity for the distance scales at hand).

FIG. 20A schematically shows localization ROC (LROC) curves for a method using solely the decision forest indicative of the intermediate result of the present method, or the final result of a method based on a decision forest alone. FIG. 20B schematically shows LROC curves for a method using the decision forest and PDM, i.e. a method in accordance with certain embodiments of the invention.

As shown in FIGS. 20A and 20B, there are multiple curves, each represent a different distance threshold as indicated in figures.

These figures demonstrate that the PDM has significantly improved the detection results as indicated by greater areas under the curves in FIG. 20B as compared to corresponding curves in FIG. 20A.

The localisation ROC analysis demonstrate the improvement of detection and localisation accuracy of the identified landmarks:
LROC AUC @inf (1000 mm): 0.904→0.948
LROC AUC @30 mm: 0.771→0.815
LROC AUC @20 mm: 0.671→0.669

In summary, these examples show that the above-described embodiment, when a PDM is applied to the detection outcome of a decision forest, generally improves the accuracy with which the landmarks are placed compared with using a decision forest alone.

General Environment

The method as described above may be implemented in software or in a combination of software and optimized or dedicated hardware, such as graphics cards or chip sets suitable for or optimized to handling of volume data sets and subsequent rendering. The software for positioning anatomical landmarks will in practice most likely be a module that forms part of a rendering application which may run on a computer workstation or a server which is part of a network operating under a client-server model. The usual context for the workstation or server on which the rendering application is resident will be a hospital network as now described. If desired, the anatomical landmark positioning module could be applied to volume data sets and the resultant joint data set could be stored in memory without carrying out visualization in the same session.

Figure 21:
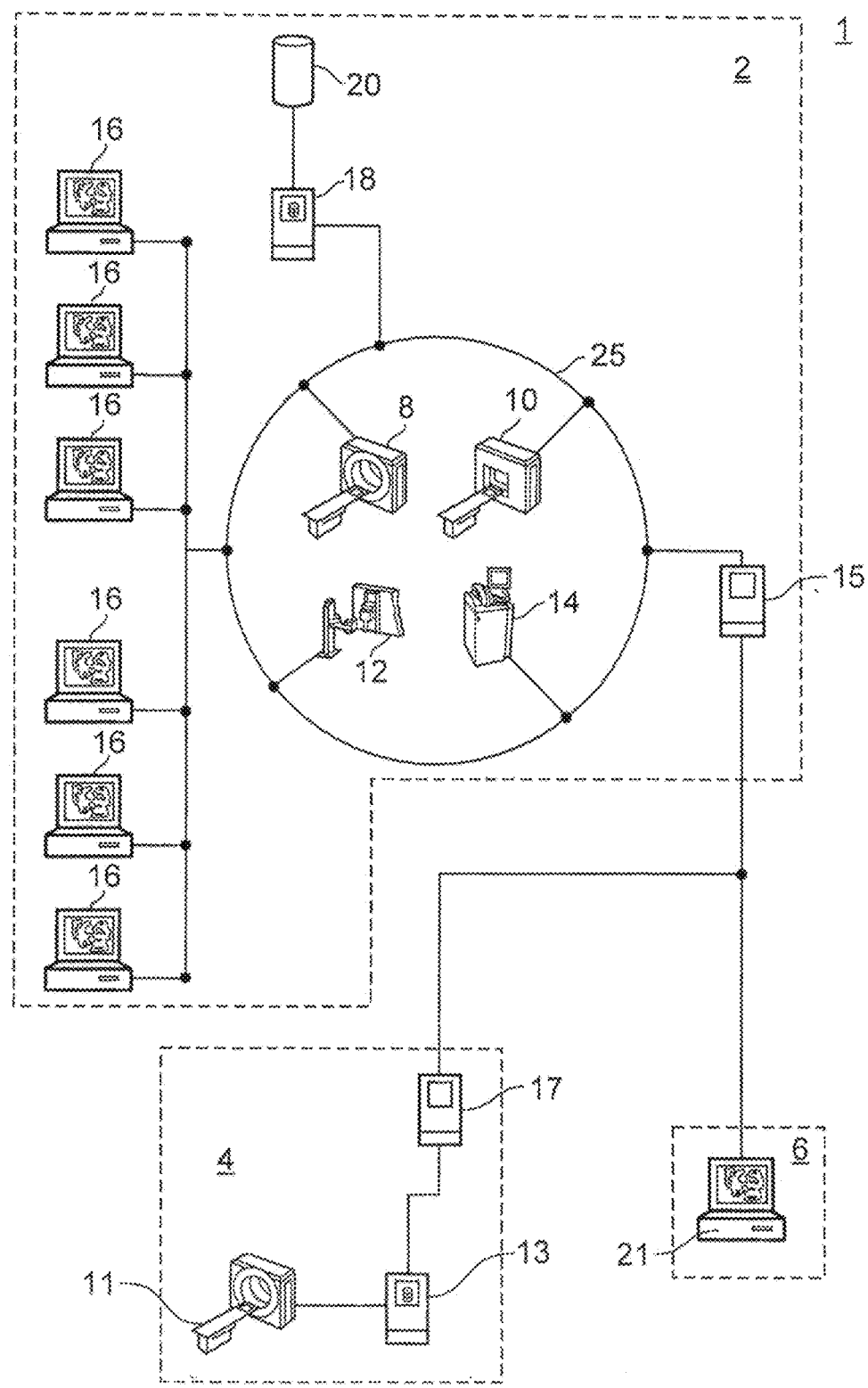
FIG. 21 is a schematic diagram showing an exemplary network of diagnostic devices and associated equipment.

FIG. 21 is a schematic representation of an exemplary network 1 of computer controlled diagnostic devices, stand-alone computer workstations and associated equipment. The network 1 comprises three components. There is a main hospital component 2, a remote diagnostic device component 4 and a remote single user component 6. The main hospital component 2 comprises a plurality of diagnostic devices for acquiring patient images, in this example, a CT scanner 8, a MR imager 10, a digital radiography (DR) device 12 and a computed radiography (CR) device 14, a plurality of computer workstations 16, a common format file server 18, a file archive 20 and an internet gateway 15. All of these features are inter-connected by a local area network (LAN) 25. It will be understood that each computer apparatus has at least one network output connection for communicating over the network.

The remote diagnostic device component 4 comprises a CT scanner 11, a common format file server 13 and an internet gateway 17. The CT scanner 11 and file server 13 are commonly connected to the internet gateway 17, which in turn is connected via the internet to the internet gateway 15 within the main hospital component 2.

The remote single user component 6 comprises a computer workstation 21 with an internal modem (not shown). The computer workstation 21 is also connected via the internet to the internet gateway 15 within the main hospital component 2.

The network 1 is configured to transmit data within a standardized common format. For example, the CT scanner 8 initially generates a source data set, i.e. a 3D image data set, from which an operator may derive an appropriate 2D image. The 2D image is encoded in a standard image data format and transferred over the LAN 25 to the file server 18 for storage on the file archive 20. A user working on one of the computer workstations 16 may subsequently request the image, the file server 18 will retrieve it from the archive 20 and pass it to the user via the LAN 25. Similarly, a user working remotely from the main hospital component 2, either within the remote diagnostic device component 4, or the remote single user component 6, may also access and transmit data stored on the archive 20, or elsewhere on the network 1.

Figure 22:
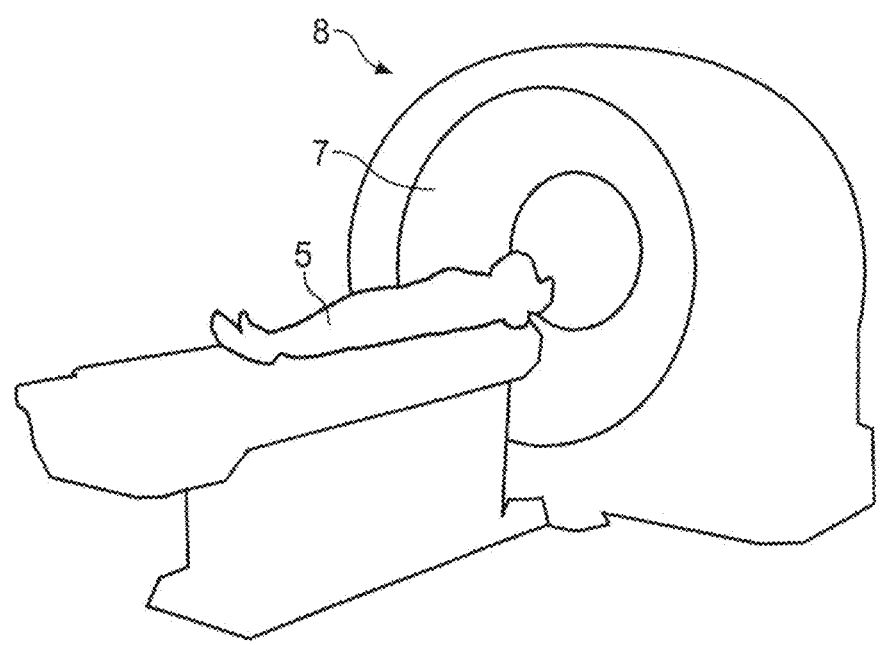
FIG. 22 shows a generic CT scanner for generating volume data.

FIG. 22 is a schematic perspective view of a generic scanner, most especially a computer-assisted tomography (CT) scanner 8 such as represented in FIG. 21, for obtaining cross-sectional images on X-ray attenuation associated with a region of a patient 5 within an opening 7 of the scanner 8. Different imaging modalities (e.g. CT, MR, PET, ultrasound) may be used to provide different types of medical image data.

With reference to FIG. 21 and FIG. 22, a rendering application with a landmark positioning module embodying the invention may be resident on any of the computer apparatuses shown, namely the workstations 6, 16, the servers 13, 15, 17, 18 or the computers and any associated graphics processing hardware associated with the scanners 8, 10, 11, 12, 14.

Figure 23A:
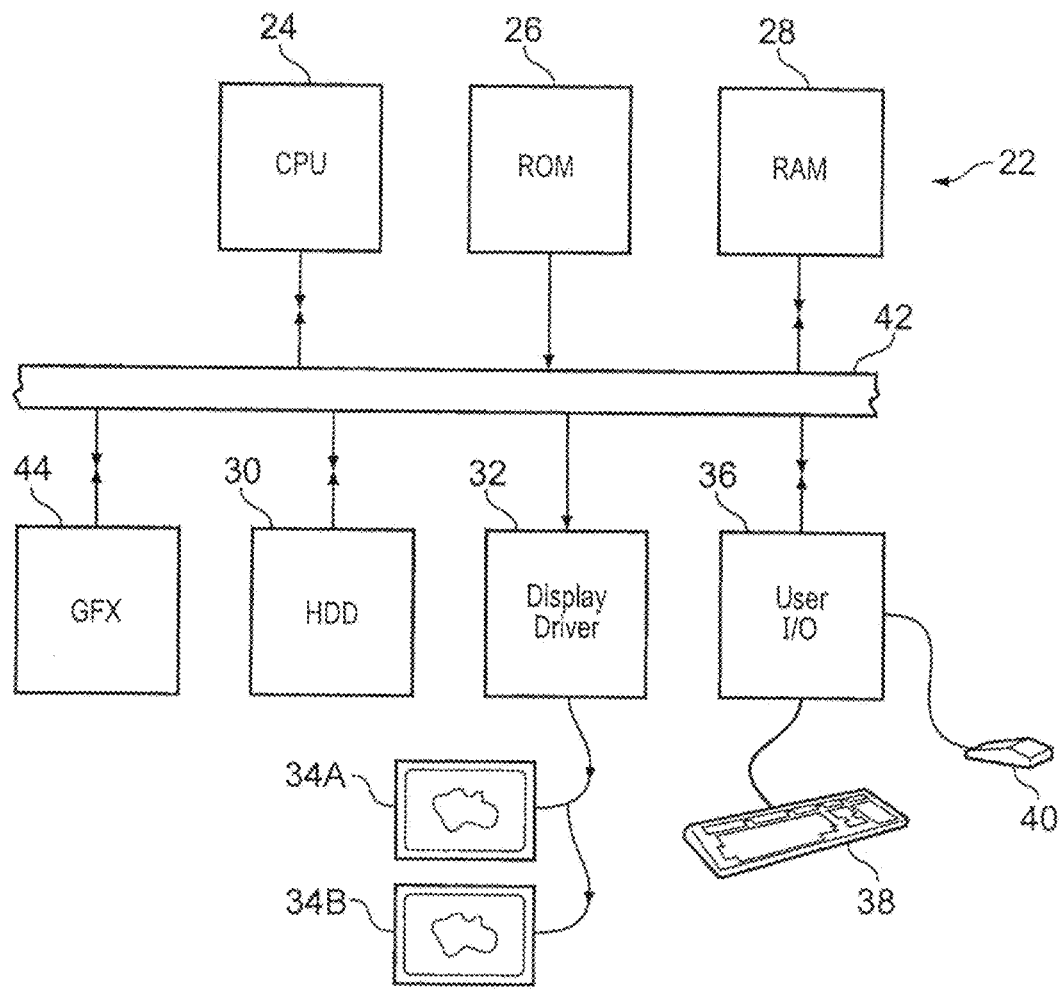
FIGS. 23A and 23B schematically show a computer system for processing image data in accordance with an embodiment of the invention.
Figure 23B:
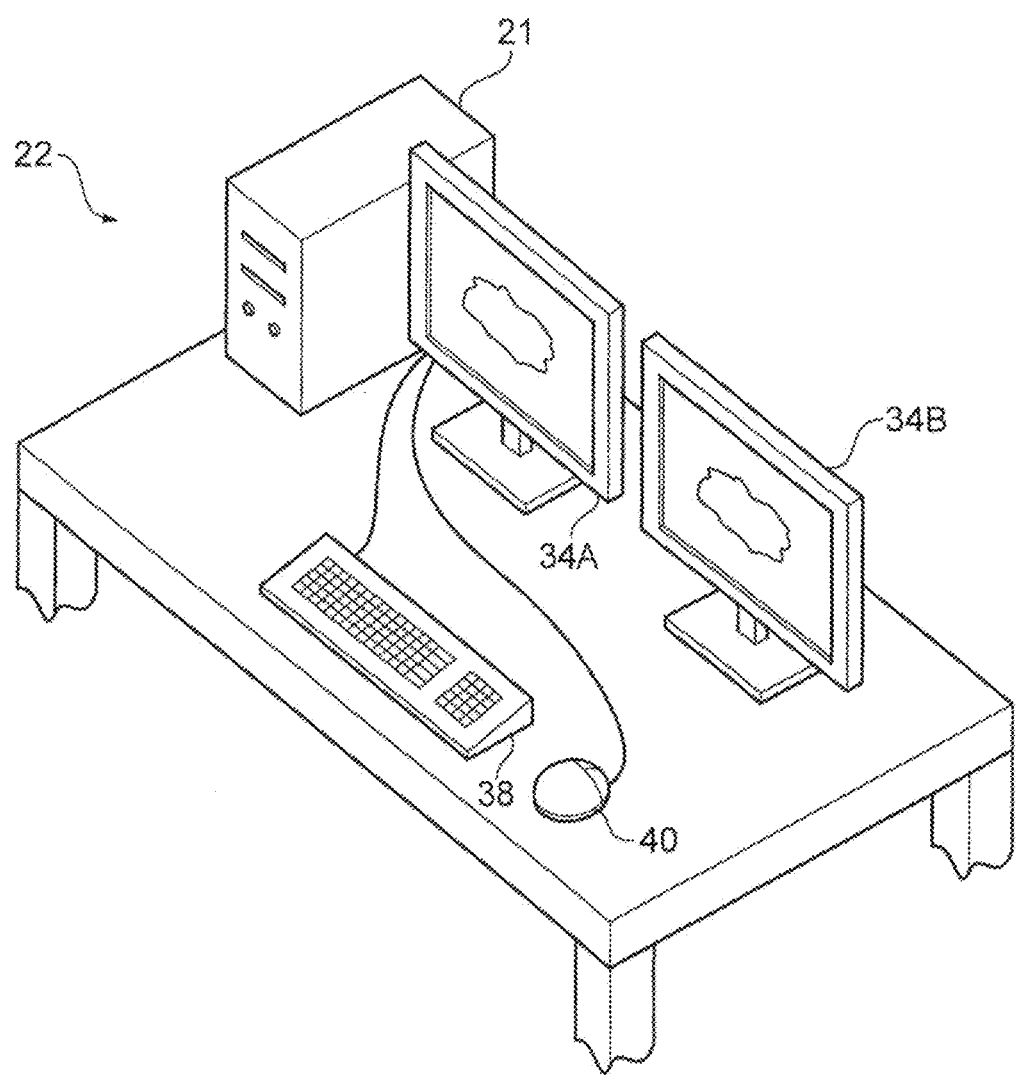

FIGS. 23A and 23B schematically illustrate a general purpose computer system 22 configured to perform processing in accordance with an embodiment of the invention. FIG. 23A primarily represents the functional units comprising the computer system 22 while FIG. 23B is a schematic perspective view showing the computer system 22 arranged for use.

The computer 22 includes a central processing unit (CPU) 24, a read only memory (ROM) 26, a random access memory (RAM) 28, a hard disk drive 30, a display driver 32, and two displays 34, namely a first display 34A and a second display 34B, and a user input/output (IO) circuit 36 coupled to a keyboard 38 and mouse 40. These devices are connected via a common bus 42. The computer 22 also includes a graphics card 44 connected via the common bus 42. The graphics card includes a graphics processing unit (GPU) and random access memory tightly coupled to the GPU (GPU memory).

The CPU 24 may execute program instructions stored within the ROM 26, the RAM 28 or the hard disk drive 30 to carry out processing, display and manipulation of medical image data that may be stored within the RAM 28 or the hard disk drive 30. The RAM 28 and hard disk drive 30 are collectively referred to as the system memory. The CPU 24 may also execute program instructions corresponding to an operating system of the computer system 22. In this respect, the CPU may be considered to comprise various functional units for performing tasks associated with the operation of the computer system 22. The GPU may also execute program instructions to carry out processing image data passed to it from the CPU.

Various functional elements comprising the computer system 22, such as the CPU 24, ROM 26, RAM 28, hard disk 30, display driver 32, user input/output (IO) circuit 36, graphics card 44 and connection bus 42 are contained in an enclosure 21. The two displays 34A, 34B, keyboard 38 and mouse 40 are in this case separate from the enclosure with appropriate wiring connecting them back to the relevant functional elements of the computer system in the enclosure 21. In this respect the computer system 22 of the example embodiment in FIGS. 23A and 23B may be considered as being of a desktop type, although other types of computer system could equally be employed.

Figure 24:
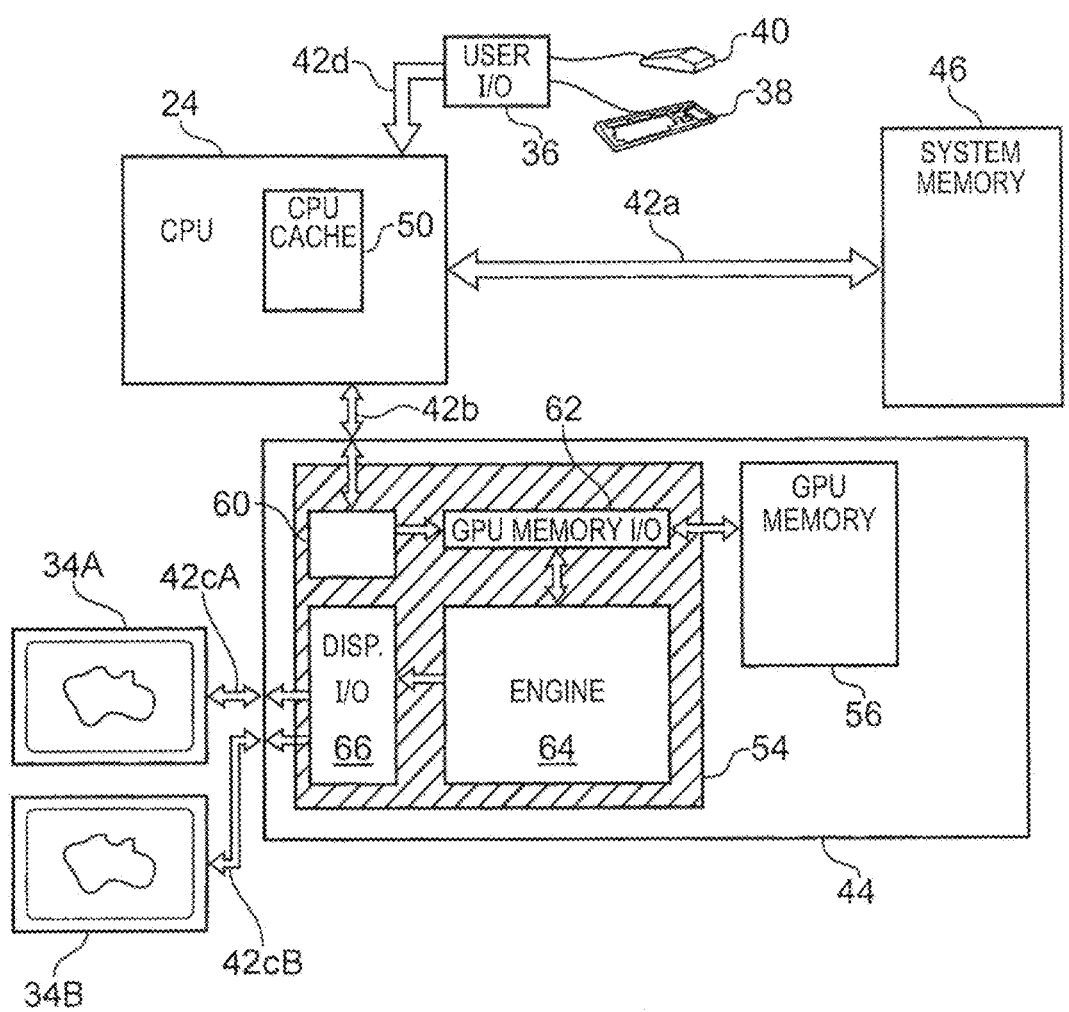
FIG. 24 schematically shows some of the features of the computer system in more detail.

FIG. 24 schematically shows some of the features of the computer system 2 shown in FIG. 23A and FIG. 23B in more detail. The RAM 28 and hard disk drive 30 are shown collectively as a system memory 46. Medical image data obtained from the scanner 8 shown in FIG. 21 is stored in the system memory as shown schematically in the figure. To assist in showing the different data transfer routes between features of the computer system 22, the common bus 42 shown in FIG. 23A is schematically shown in FIG. 24 as a series of separate bus connections 42a-d. One bus connection 42a connects between the system memory 46 and the CPU 24. Another bus connection 42b connects between the CPU 24 and the graphics card 44. A further pair of bus connections, namely a first bus connection 42cA and a second bus connection 42cB, connects between the graphics card 44 and respective ones of the displays 34A, 34B. Another bus connection 42d connects between the user I/O circuit 36, cursor control unit 27 and the CPU 24. The CPU includes a CPU cache 50. The graphics card 44 includes a GPU 54 and a GPU memory 56. The GPU 54 includes circuitry for providing an accelerated graphics processing interface 60, a GPU cache I/O controller 62, a processing engine 64 and a display I/O controller 66. The processing engine 64 is designed for optimized execution of the types of program instructions typically associated with processing medical image data sets.

A user is able to select desired processing parameters using the keyboard 38 and mouse 40 (or other pointing device, such as a track pad or pen tablet/digitizer) in combination with a graphical user interface (GUI) displayed on the display 34, for example using a movable screen cursor in combination with the mouse, track pad etc. to point and click within respective ones of the first and second displays 34A, 34B.

With reference to FIG. 23A, FIG. 23B and FIG. 24, the rendering application with landmark positioning module embodying the invention may be stored on HDD 30 and/or ROM 26. When the application is to be run, it can as necessary be loaded into system memory 46 or RAM 28. At run time, faster memory such as cache memory 50, 62 available to the CPU 24 and GPU 54, will also host some of the application. The images output from the rendering application can be displayed on suitable displays, such as first and second displays 34A, 34B. The images output from the rendering application can also be stored in suitable memory. The images output from the rendering application can also be transmitted over the network to be displayed or stored at another location in the network.

Moreover, references to three-dimensional image data sets includes sequences of three dimensional image data sets, such as produced by time-resolved imaging which are sometimes referred to as four-dimensional image data sets.

Certain embodiments of the invention provide a computer program product, which may be a non-transitory computer program product, bearing machine readable instructions for carrying out the method.

Certain embodiments of the invention provide a computer system loaded with and operable to execute machine readable instructions for carrying out the method.

Certain embodiments of the invention provide an image acquisition device loaded with and operable to execute machine readable instructions for carrying out the method.

Embodiments of the present invention will be described hereinafter and in the context of a computer-implemented system, method and computer program product which may be stored on a non-transitory medium. Although some of the present embodiments are described in terms of a computer program product that causes a computer, for example a personal computer or other form of workstation, to provide the functionality required of some embodiments of the invention, it will be appreciated from the following description that this relates to only one example of some embodiments of the present invention. For example, in some embodiments of the invention, a network of computers, rather than a stand-alone computer, may implement the embodiments of the invention. Alternatively, or in addition, at least some of the functionality of the invention may be implemented by means of special purpose hardware, for example in the form of special purpose integrated circuits (e.g., Application Specific Integrated Circuits (ASICs)).

While certain embodiments have been described, these embodiments have been presented by way of example only, and are not intended to limit the scope of the inventions. Indeed, the novel methods, computers and computer program products and devices described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computer apparatus to position a set of anatomical landmarks in a three-dimensional image data set of a part or all of a patient, comprising:
   processing circuitry configured to
   provide a trained supervised machine learning algorithm which has been trained to place each of the set of anatomical landmarks;
   apply the supervised machine learning algorithm to place the set of anatomical landmarks relative to the data set;
   provide a trained point distribution model, including a mean shape and a covariance matrix, wherein the mean shape represents locations of the set of landmarks in a variety of patients; and
   apply the point distribution model to the set of landmarks with the locations output from the supervised machine learning algorithm by:
   (i) removing any landmarks whose locations have an uncertainty above a threshold with reference to the mean shape and covariance matrix; followed by:
   (ii) an optimisation of the locations of the remaining landmarks by maximising joint likelihood that a new shape, derived from linear combinations of eigenvectors of the covariance matrix, is plausible.

2. The apparatus of claim 1, wherein, if a landmark is removed in (i), the landmark is later replaced at a location obtained from the other landmarks with reference to the mean shape.

3. The apparatus of claim 2, wherein the landmark replacement is carried out before said optimisation, so that replaced landmarks are included in said optimisation.

4. The apparatus of claim 1, wherein the landmark removal in the point distribution model is done by iteratively computing a weighted least trimmed square and in each iteration removing the landmark with the highest residual squared sum, wherein the iteration is terminated when the highest residual squared sum is below the threshold.

5. The apparatus of claim 1, wherein the trained supervised machine learning algorithm is a decision forest algorithm.

6. The apparatus of claim 5, wherein the decision forest algorithm is based on classification.

7. The apparatus of claim 5, wherein the decision forest algorithm is based on regression.

8. A method of positioning a set of anatomical landmarks in a three-dimensional image data set of a part or all of a patient, comprising:
   a. providing a trained supervised machine learning algorithm which has been trained to place each of the set of anatomical landmarks;
   b. applying the supervised machine learning algorithm to place the set of anatomical landmarks relative to the data set;
   c. providing a trained point distribution model, including a mean shape and a covariance matrix, wherein the mean shape represents locations of the set of landmarks in a variety of patients; and
   d. applying the point distribution model to the set of landmarks with the locations output from the supervised machine learning algorithm by:
      (i) removing any landmarks whose locations have an uncertainty above a threshold with reference to the mean shape and covariance matrix; followed by:
      (ii) an optimisation of the locations of the remaining landmarks by maximising joint likelihood that a new shape, derived from linear combinations of eigenvectors of the covariance matrix, is plausible.

9. The method of claim 8, wherein, if a landmark is removed in d(i), the landmark is later replaced at a location obtained from the other landmarks with reference to the mean shape.

10. The method of claim 9, wherein the landmark replacement is carried out before said optimisation, so that replaced landmarks are included in said optimisation.

11. The method of claim 8, wherein the landmark removal in the point distribution model is done by iteratively computing a weighted least trimmed square and in each iteration removing the landmark with the highest residual squared sum, wherein the iteration is terminated when the highest residual squared sum is below the threshold.

12. The method of claim 8, wherein the trained supervised machine learning algorithm is a decision forest algorithm.

13. The method of claim 12, wherein the decision forest algorithm is based on classification.

14. The method of claim 12, wherein the decision forest algorithm is based on regression.

15. A non-transitory computer program product storing machine readable instructions for performing the computer-automated data processing method of claim 8.

* * * * *